(12) United States Patent
Weiss

(10) Patent No.: US 10,547,978 B1
(45) Date of Patent: Jan. 28, 2020

(54) TWO-WAY COMMUNICATION SYSTEM IMPLEMENTING LOCATION TRACKING

(71) Applicant: WALGREEN CO., Deerfield, IL (US)

(72) Inventor: Benjamin Weiss, Chicago, IL (US)

(73) Assignee: WALGREEN CO., Deerfield, IL (US)

( * ) Notice: Subject to any disclaimer, the term of this patent is extended or adjusted under 35 U.S.C. 154(b) by 0 days.

(21) Appl. No.: 16/121,240

(22) Filed: Sep. 4, 2018

(51) Int. Cl.
| | | |
|---|---|---|
| *H04W 24/00* | (2009.01) | |
| *H04W 4/029* | (2018.01) | |
| *H04W 4/021* | (2018.01) | |
| *G06Q 30/06* | (2012.01) | |
| *H04B 17/318* | (2015.01) | |
| *H04W 4/33* | (2018.01) | |

(52) U.S. Cl.
CPC ........ *H04W 4/029* (2018.02); *G06Q 30/0601* (2013.01); *H04B 17/318* (2015.01); *H04W 4/021* (2013.01); *H04W 4/33* (2018.02)

(58) Field of Classification Search
CPC ..... H04W 4/029; H04W 4/043; H04W 64/00; H04W 12/06; H04W 48/06; H04W 48/08; H04W 48/16; H04W 4/02; H04W 72/087; H04W 76/10; H04W 84/12; H04W 88/08; H04W 88/10
USPC .......... 455/456.1, 69, 73, 439, 456.3, 456.5, 455/422.1, 12.1, 427, 438, 418, 411, 557
See application file for complete search history.

(56) References Cited

U.S. PATENT DOCUMENTS

| | | | |
|---|---|---|---|
| 5,821,855 A | * | 10/1998 | Lewis ..................... G08B 25/10 340/539.16 |
| 6,439,345 B1 | | 8/2002 | Recktenwald et al. |
| 6,711,460 B1 | | 3/2004 | Reese |
| 8,009,644 B2 | * | 8/2011 | Kuo ..................... H04W 12/06 370/338 |
| 8,170,909 B2 | | 5/2012 | Brown et al. |
| 8,626,530 B1 | | 1/2014 | Tran et al. |

(Continued)

FOREIGN PATENT DOCUMENTS

WO    WO-2010/005730 A2    1/2010

OTHER PUBLICATIONS

Elgan, Why Apple's Indoor GPS Plan is Brilliant, Computer Word, 8 pp. (Sep. 13, 2013).

(Continued)

*Primary Examiner* — Joseph Arevalo
(74) *Attorney, Agent, or Firm* — Marshall, Gerstein & Borun LLP

(57) ABSTRACT

Embodiments are disclosed to enable customers and store personnel to communication while the customers are in an access area of a brick-and-mortar store. The access area may have one or more transmitters installed at predetermined locations. By utilizing an application installed on each customer's mobile computing device, each mobile computing device may transmit ranging data and information indicative of the customer when within range of one or more of the transmitters. The ranging data may include an indication of a range between each of the customer's mobile computing device and one or more proximate transmitters. By correlating the information indicative of the customer to a customer's account information, information relevant to the customer may be determined. A customer may be sent a notification including a portion of the relevant information. The notification may enable the customer to contact the personnel of the brick-and-mortar store.

17 Claims, 8 Drawing Sheets

(56) References Cited

U.S. PATENT DOCUMENTS

| | | | |
|---|---|---|---|
| 8,758,238 | B2 | 6/2014 | Clapp |
| 9,002,375 | B1 | 4/2015 | Lerner et al. |
| 9,264,151 | B1* | 2/2016 | Emigh .............. G06Q 30/0211 |
| 9,430,781 | B1 | 8/2016 | Kerr et al. |
| 9,824,323 | B1 | 11/2017 | Weiss et al. |
| 9,904,903 | B1 | 2/2018 | Weiss et al. |
| 10,068,221 | B1* | 9/2018 | Thomas ............... G06Q 20/322 |
| 10,074,084 | B1 | 9/2018 | Jhaveri et al. |
| 2002/0016740 | A1 | 2/2002 | Ogasawara |
| 2002/0128850 | A1 | 9/2002 | Chen et al. |
| 2002/0128863 | A1 | 9/2002 | Richmond |
| 2002/0143592 | A1 | 10/2002 | Nishikawa et al. |
| 2002/0178107 | A1 | 11/2002 | Biancavilla |
| 2003/0028399 | A1 | 2/2003 | Davis et al. |
| 2003/0195821 | A1 | 10/2003 | Kennamer |
| 2004/0263388 | A1* | 12/2004 | Krumm ............... G01C 21/206 342/451 |
| 2004/0266335 | A1 | 12/2004 | Usui et al. |
| 2004/0266465 | A1* | 12/2004 | Zegelin .............. G01N 33/6842 455/500 |
| 2005/0136845 | A1 | 6/2005 | Masuoka et al. |
| 2005/0197752 | A1* | 9/2005 | Yang ..................... G05D 1/0261 701/23 |
| 2006/0111053 | A1 | 5/2006 | Wu et al. |
| 2006/0111941 | A1* | 5/2006 | Blom ..................... G06Q 10/06 705/2 |
| 2007/0088624 | A1* | 4/2007 | Vaughn ................. G06Q 30/02 705/15 |
| 2007/0184852 | A1 | 8/2007 | Johnson et al. |
| 2008/0059227 | A1 | 3/2008 | Clapp |
| 2008/0097769 | A1 | 4/2008 | Galvin et al. |
| 2008/0149721 | A1 | 6/2008 | Shadwell |
| 2008/0255929 | A1 | 10/2008 | Mouton |
| 2009/0112683 | A1 | 4/2009 | Hamilton, II et al. |
| 2010/0020776 | A1 | 1/2010 | Youssef et al. |
| 2010/0038416 | A1 | 2/2010 | Canora |
| 2010/0098036 | A1 | 4/2010 | Li |
| 2010/0159980 | A1 | 6/2010 | Mikan et al. |
| 2010/0161356 | A1 | 6/2010 | Louie et al. |
| 2010/0280911 | A1 | 11/2010 | Roberts et al. |
| 2011/0028161 | A1 | 2/2011 | Larsen |
| 2011/0139545 | A1 | 6/2011 | Bridgman et al. |
| 2011/0166878 | A1 | 7/2011 | Louie et al. |
| 2011/0221568 | A1 | 9/2011 | Giobbi |
| 2011/0257989 | A1 | 10/2011 | Kumar |
| 2012/0023171 | A1 | 1/2012 | Redmond |
| 2012/0030726 | A1 | 2/2012 | Winter et al. |
| 2012/0115512 | A1 | 5/2012 | Grainger et al. |
| 2012/0185263 | A1 | 7/2012 | Emert |
| 2012/0239417 | A1 | 9/2012 | Pourfallah et al. |
| 2012/0253831 | A1 | 10/2012 | John et al. |
| 2013/0006663 | A1 | 1/2013 | Bertha et al. |
| 2013/0006718 | A1 | 1/2013 | Nielsen et al. |
| 2013/0226704 | A1 | 8/2013 | Fernandez |
| 2013/0256403 | A1 | 10/2013 | MacKinnon |
| 2013/0317944 | A1 | 11/2013 | Huang et al. |
| 2014/0054381 | A1 | 2/2014 | Cha et al. |
| 2014/0074743 | A1 | 3/2014 | Rademaker |
| 2014/0089111 | A1 | 3/2014 | Fernandez |
| 2014/0114877 | A1 | 4/2014 | Montano |
| 2014/0143060 | A1 | 5/2014 | Fernandez |
| 2014/0180817 | A1 | 6/2014 | Zilkha |
| 2014/0200937 | A1 | 7/2014 | Friedman |
| 2014/0278466 | A1 | 9/2014 | Simmons et al. |
| 2014/0365304 | A1 | 12/2014 | Showers et al. |
| 2015/0095161 | A1* | 4/2015 | Goel .................. G06Q 30/0267 705/14.64 |
| 2015/0112774 | A1 | 4/2015 | Georgoff et al. |
| 2015/0134429 | A1 | 5/2015 | Katakwar et al. |
| 2015/0178798 | A1 | 6/2015 | Garforth-Bles |
| 2015/0221010 | A1 | 8/2015 | Ming |
| 2015/0294084 | A1* | 10/2015 | McCauley ......... G06F 19/3456 705/2 |
| 2015/0348003 | A1 | 12/2015 | Reader |
| 2015/0356257 | A1* | 12/2015 | Wright .................. H04L 9/0894 705/51 |
| 2015/0363816 | A1 | 12/2015 | Poglitsch |
| 2016/0196553 | A1* | 7/2016 | Barhydt ............. G06Q 20/3829 705/71 |
| 2017/0046753 | A1 | 2/2017 | Deupree, IV |
| 2017/0150311 | A1* | 5/2017 | Krinsky ................. H04L 1/0007 |
| 2018/0341939 | A1 | 11/2018 | Jhaveri et al. |

OTHER PUBLICATIONS

U.S. Appl. No. 13/286,909, filed Nov. 1, 2011.
U.S. Appl. No. 13/286,909, Final Office Action, dated Aug. 31, 2016.
U.S. Appl. No. 13/286,909, Final Office Action, dated Jul. 16, 2013.
U.S. Appl. No. 13/286,909, Final Office Action, dated Jun. 26, 2015.
U.S. Appl. No. 13/286,909, Final Office Action, dated Nov. 3, 2017.
U.S. Appl. No. 13/286,909, Nonfinal Office Action, dated Dec. 18, 2015.
U.S. Appl. No. 13/286,909, Nonfinal Office Action, dated Jan. 17, 2013.
U.S. Appl. No. 13/286,909, Nonfinal Office Action, dated Mar. 24, 2017.
U.S. Appl. No. 13/286,909, Nonfinal Office Action, dated Nov. 20, 2014.
U.S. Appl. No. 13/286,909, Notice of Allowance, dated May 7, 2018.
U.S. Appl. No. 14/249,492, Advisory Action, dated Oct. 2, 2017.
U.S. Appl. No. 14/249,492, filed Apr. 10, 2014.
U.S. Appl. No. 14/249,492, Final Office Action, dated Jul. 14, 2016.
U.S. Appl. No. 14/249,492, Final Office Action, dated Sep. 7, 2018.
U.S. Appl. No. 14/249,492, Final Office Action, dated Jun. 19, 2017.
U.S. Appl. No. 14/249,492, Nonfinal Office Action, dated Dec. 19, 2016.
U.S. Appl. No. 14/249,492, Nonfinal Office Action, dated Feb. 19, 2016.
U.S. Appl. No. 14/288,087, filed May 27, 2014.
U.S. Appl. No. 14/288,087, Final Office Action, dated Aug. 25, 2016.
U.S. Appl. No. 14/288,087, Final Office Action, dated Jul. 16, 2015.
U.S. Appl. No. 14/288,087, Final Office Action, dated May 3, 2018.
U.S. Appl. No. 14/288,087, Nonfinal Office Action, dated Dec. 18, 2015.
U.S. Appl. No. 14/288,087, Nonfinal Office Action, dated Jul. 27, 2017.
U.S. Appl. No. 14/288,087, Nonfinal Office Action, dated Mar. 27, 2015.
U.S. Appl. No. 14/456,713, filed Aug. 11, 2014.
U.S. Appl. No. 14/456,713, Final Office Action, dated Mar. 10, 2017.
U.S. Appl. No. 14/456,713, Nonfinal Office Action, dated Dec. 1, 2016.
U.S. Appl. No. 14/456,713, Notice of Allowance, dated Jul. 3, 2017.
U.S. Appl. No. 14/526,887, filed Oct. 29, 2014.
U.S. Appl. No. 14/526,887, Nonfinal Office Action, dated Oct. 6, 2017.
U.S. Appl. No. 14/526,887, Notice of Allowance, dated May 1, 2018.
U.S. Appl. No. 14/530,179, filed Oct. 31, 2014.
U.S. Appl. No. 14/530,179, Nonfinal Office Action, dated May 17, 2017.
U.S. Appl. No. 14/530,179, Notice of Allowance, dated Nov. 22, 2017.
U.S. Appl. No. 15/142,557, "Leveraging Predictive Modeling for Application Optimization", filed Apr. 29, 2016.
U.S. Appl. No. 15/717,506, "Gathering In-Store Employee Ratings Using Triggered Feedback Solicitations", filed Sep. 27, 2017.
U.S. Appl. No. 15/717,506, Final Office Action, dated Apr. 23, 2018.
U.S. Appl. No. 15/717,506, Nonfinal Office Action, dated Aug. 3, 2018.
U.S. Appl. No. 15/717,506, Nonfinal Office Action, dated Dec. 22, 2017.

(56) References Cited

OTHER PUBLICATIONS

U.S. Appl. No. 15/856,395, "Drive-Thru System Implementing Location Tracking", filed Dec. 28, 2017.
U.S. Appl. No. 16/134,241, "Drive-Thru System Implementing Location Tracking", filed Sep. 18, 2018.

* cited by examiner

| ID NUMBER | RANGING DATA - Transmitter 108.3 |
|---|---|
| 9132654 (CAR 110.2) | -85 dBm |
| 2348938 (CAR 110.1) | -99 dBm |
| 2348938 (CAR 110.3) | -72 dBm |

| | |
|---|---|
| POSITION 1 | ID# 3265915 (CAR 110.3) |
| POSITION 2 | ID# 9132654 (CAR 110.2) |
| POSITION 3 | ID# 2348938 (CAR 110.1) |

| ID NUMBER | RANGING DATA - Transmitter 108.3 |
|---|---|
| 3265915 (CAR 110.3) | -72 dBm |
| 9132654 (CAR 110.2) | -86 dBm |
| 2348938 (CAR 110.1) | -88 dBm |

| ID NUMBER | RANGING DATA - Transmitter 108.2 |
|---|---|
| 3265915 (CAR 110.3) | -75 dBm |
| 9132654 (CAR 110.2) | -65 dBm |
| 2348938 (CAR 110.1) | -77 dBm |

| ID NUMBER | RANGING DATA - Transmitter 108.1 |
|---|---|
| 3265915 (CAR 110.3) | -92 dBm |
| 9132654 (CAR 110.2) | -84 dBm |
| 2348938 (CAR 110.1) | -68 dBm |

| | |
|---|---|
| POSITION 1 | ID# 3265915 (CAR 110.3) |
| POSITION 2 | ID# 9132654 (CAR 110.2) |
| POSITION 3 | ID# 2348938 (CAR 110.1) |

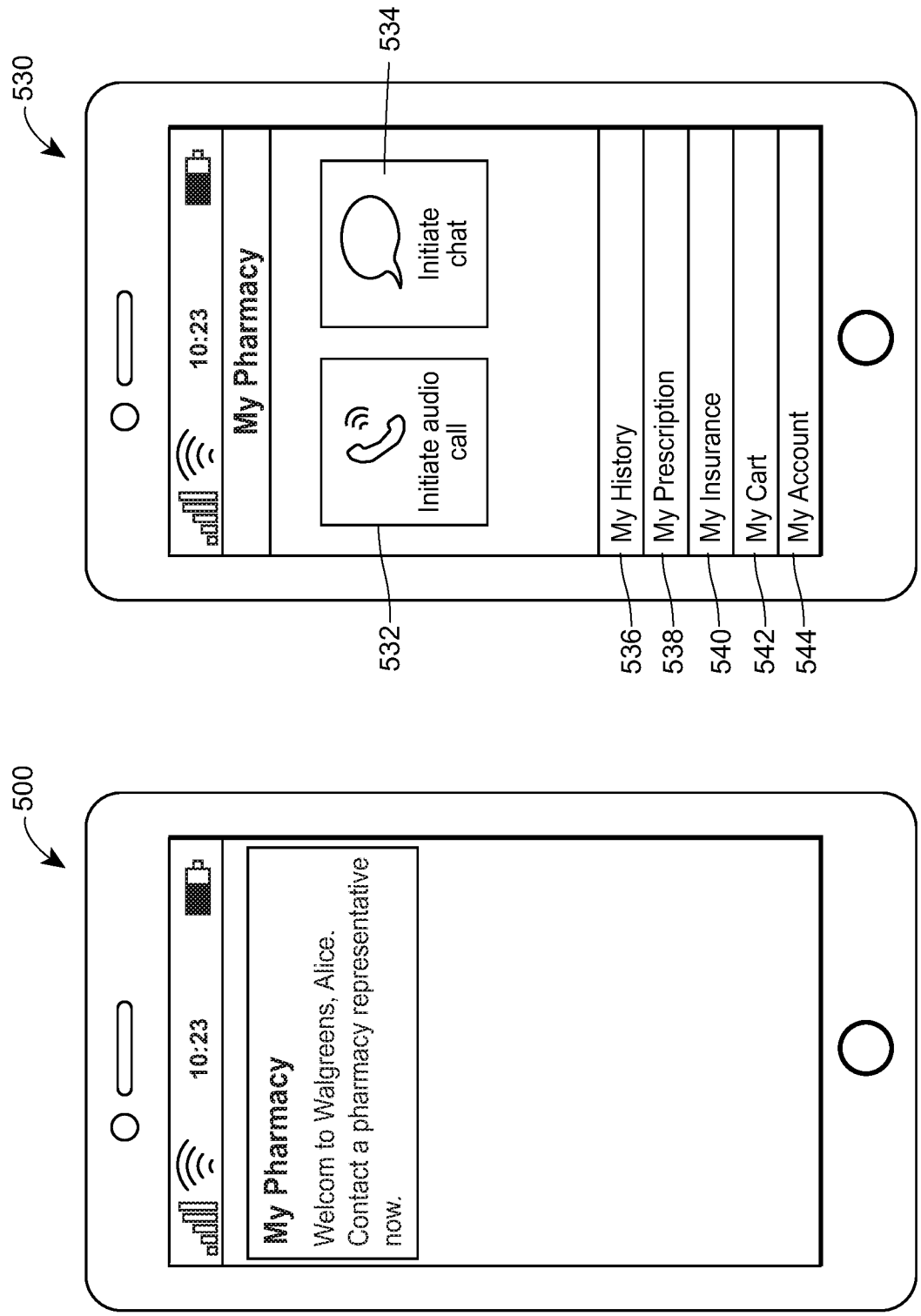

TWO-WAY COMMUNICATION SYSTEM IMPLEMENTING LOCATION TRACKING

FIELD OF DISCLOSURE

The present disclosure relates generally to location tracking, and more particularly to tracking customers in an access area of a brick-and-mortar store and enabling two-way communication between customers and personnel of the brick-and-mortar store while the customers are in the access area.

BACKGROUND

A pharmacy often receives prescription information for a customer ahead of that customer's visit to the pharmacy. In some cases, a pharmacy customer may call in a prescription refill in advance of a visit to the pharmacy to pick up the refill. In other cases, a prescription may be called in by a customer's health care provider ahead of the customer's visit to pick up the prescription. Additionally, a pharmacy may have access to further customer information required to process prescriptions including health insurance information, health care provider information, and payment method information. A pharmacy may also have access to a customer's health information including a patient's medical history and allergies.

To make pharmacy visits more convenient for customers, some pharmacies have implemented drive-through, rapid pick-up, or other services. The drive-thru pickup process generally involves the customer communicating with pharmacy staff using a speaker and microphone located outside of the pharmacy at the start of a drive-thru lane. Once the pharmacy staff receives the customer information by speaking to the customer, the pharmacy staff fills the prescription order, hands the customer the prescription order when the vehicle pulls up to a drive-thru window, processes the payment, and answers any questions regarding the medication. The rapid pickup process generally involves the customer communicating with store personnel ahead of visiting the pharmacy. Once the customer arrives at the store, the customer may be serviced in his or her vehicle or at a rapid pick-up counter, for example. The pharmacy staff may then hand the customer the prescription order, process the payment, and answer any questions regarding the medication.

Conventional systems often suffer from inefficiencies because while several customers may be waiting in an access area, such as a drive-thru lane or rapid pick-up area, only one customer may be serviced at a time. For example, conventional systems require waiting customers to be identified by direct interaction between the customer and the pharmacy staff (i.e., over an intercom or at a drive-thru window), which slows the process as time is needed to enter the customer's information, lookup the customer's account, and, if applicable, fill and hand over the customer's prescription order. Additionally, a customer may have questions or concerns to discuss with pharmacy staff regarding, for example, changes to his or her information or concerns over a new prescription, further slowing down the process as the conversations happen through direct interaction with pharmacy staff and one at a time.

Accordingly, there is an opportunity for platforms and technologies that enable more efficiency in a customer waiting or pickup area.

SUMMARY

The present embodiments relate to enabling two-way communication between customers in an access area of a brick-and-mortar store and personnel of the brick-and-mortar store. The embodiments may include receiving information from a customer, identifying the customer, and accessing information associated with the customer. The embodiments may further include accessing information associated with the brick-and-mortar store. The embodiments may further include enabling the customer to initiate two-way communication with personnel of the brick-and-mortar store and enabling personnel of the brick-and-mortar store to initiate two-way communication with the customer. Additional, fewer, or alternative features described herein below may be included in some aspects.

In one aspect, a method for enabling two-way communication between personnel of a brick-and-mortar store and each of a plurality of customers within an access area of the brick-and-mortar store may be provided. The method may include (1) receiving information indicative of a plurality of customers located in the access area, the information being sent from a plurality of computing devices respectively associated with the plurality of customers; (2) determining (i) a first set of information relevant to a first customer of the plurality of customers located in the access area, and (ii) a second set of information relevant to a second customer of the plurality of customers located in the access area; (3) generating (i) a first notification including at least a portion of the first set of information, and (ii) a second notification and including at least a portion of the second set of information; and/or (4) transmitting (i) the first notification to a first computing device of the plurality of computing devices associated with the first customer, wherein the first computing device displays the first notification, and (ii) the second notification to a second computing device of the plurality of computing devices associated with the second customer, wherein the second computing device displays the second notification. The method may include additional, fewer, or alternate functionalities or actions, including those discussed elsewhere herein.

For instance, a server may be located at the brick-and-mortar store or remote from the brick-and-mortar store and the store personnel may be located at the brick-and-mortar store or remote from the brick-and-mortar store. Additionally, (i) the first notification may enable the first computing device to initiate one of a live chat session or a live audio session with the server, and (ii) the second notification may enable the second computing device to initiate one of a live chat session or a live audio session with the server. In some embodiments, the first set of information relevant to the first customer may include one or more of first reason for visit information or first order pickup information associated with the first customer, and (ii) the second set of information relevant to the second customer may include one or more of second reason for visit information or second order pickup information associated with the second customer.

In further embodiments, the method may further include (1) receiving (i) first ranging data indicative of first received signal strengths corresponding to a first plurality of signals received by the first computing device, the first plurality of signals being transmitted by a transmitter that is positioned at a predetermined location within the access area and (ii) second ranging data indicative of second received signal strengths corresponding to a second plurality of signals received by the second computing device, the second plurality of signals being transmitted by the transmitter that is positioned at the predetermined location within the access area; and/or (2) determining a position of (i) the first computing device within the access area based upon the first ranging data and the predetermined location of the transmitter, and (ii) the second computing device within the access area based upon the second ranging data and the predetermined location of the transmitter.

In further embodiments, the method may further include transmitting the first notification and the second notification based on the respective positions of the of computing devices within the access area. In still further embodiments, the method may include determining that the first customer and the second customer are located in a common vehicle based upon the first ranging data, the second ranging data, and the predetermined location of the transmitter. In still further embodiments, the method may include transmitting via the communication network from the server, one of the first notification to the first computing device or the second notification to the second computing device.

Systems or computer-readable media storing instructions for implementing all or part of the methods described above may also be provided in some aspects. Systems for implementing such methods may include one or more of the following: a computing device, a mobile computing device, a remote server, one or more communication modules configured to communicate wirelessly via radio links, radio frequency links, and/or wireless communication channels, and/or one or more program memories coupled to one or more processors of any such computing devices or servers. Such program memories may store instructions to cause the one or more processors to implement part or all of the method described above.

BRIEF DESCRIPTION OF THE DRAWINGS

The figures depict preferred embodiments for purposes of illustration only. One skilled in the art will readily recognize from the following discussion that alternative embodiments of the systems and methods illustrated herein may be employed without departing from the principles of the invention described herein.

FIG. 4A illustrates a block diagram of an exemplary set of ranging data used to determine customer locations within an access area using a single transmitter;

FIG. 4B illustrates a block diagram of an exemplary set of ranging data used to determine customer locations within an access area using multiple transmitters;

FIG. 5A illustrates an exemplary primary user interface 500 for two-way communication availability notification to a customer;

FIG. 5B illustrates an exemplary secondary user interface 530 for customer two-way communication option presentation and selection;

DETAILED DESCRIPTION

The following text sets forth a detailed description of numerous different embodiments. However, it should be understood that the detailed description is to be construed as exemplary only and does not describe every possible embodiment since describing every possible embodiment would be impractical. One of ordinary skill in the art will recognize, in light of the teaching and disclosure herein, that numerous alternative embodiments could be implemented.

It should be understood that, unless a term is expressly defined in this patent application using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent application.

The following disclosure describes several embodiments in the context of a brick-and-mortar pharmacy and drive-thru two-way communication system. However, the embodiments described throughout the disclosure may also be applicable to any suitable type of system in which customers in an access area of a store, such as a drive-thru lane or rapid pickup area, may communicate with store personnel. For example, various embodiments may include establishing two-way communication with customers waiting in vehicles in a restaurant drive-thru lane or order pickup waiting area. As will be appreciated by those of ordinary skill in the relevant art(s), the customer information, the reason for visit information, the order information, and/or the store information may change based upon a particular application. For example, a restaurant may receive a customer's name and food order instead of determining recently filled prescriptions associated with the customer. Furthermore, depending on a particular application, the customer's reason for visit information and/or order information may be entered on his mobile computing device in conjunction with a mobile application. In such alternate applications of the disclosed embodiments, an applicable computing device may receive the customer's information, reason for visit information, and/or order information from the customer's mobile computing device directly in a peer-to-peer fashion, or indirectly, via network communications between the computing device and the mobile computing device through one or more back-end components. Further, in such alternate applications of the disclosed embodiments, an applicable computing device may send a notification or other information to the customer's mobile computing device directly in a peer-to-peer fashion, or indirectly, via network communications between the computing device and the mobile computing device through one or more back-end-components.

Figure 1:
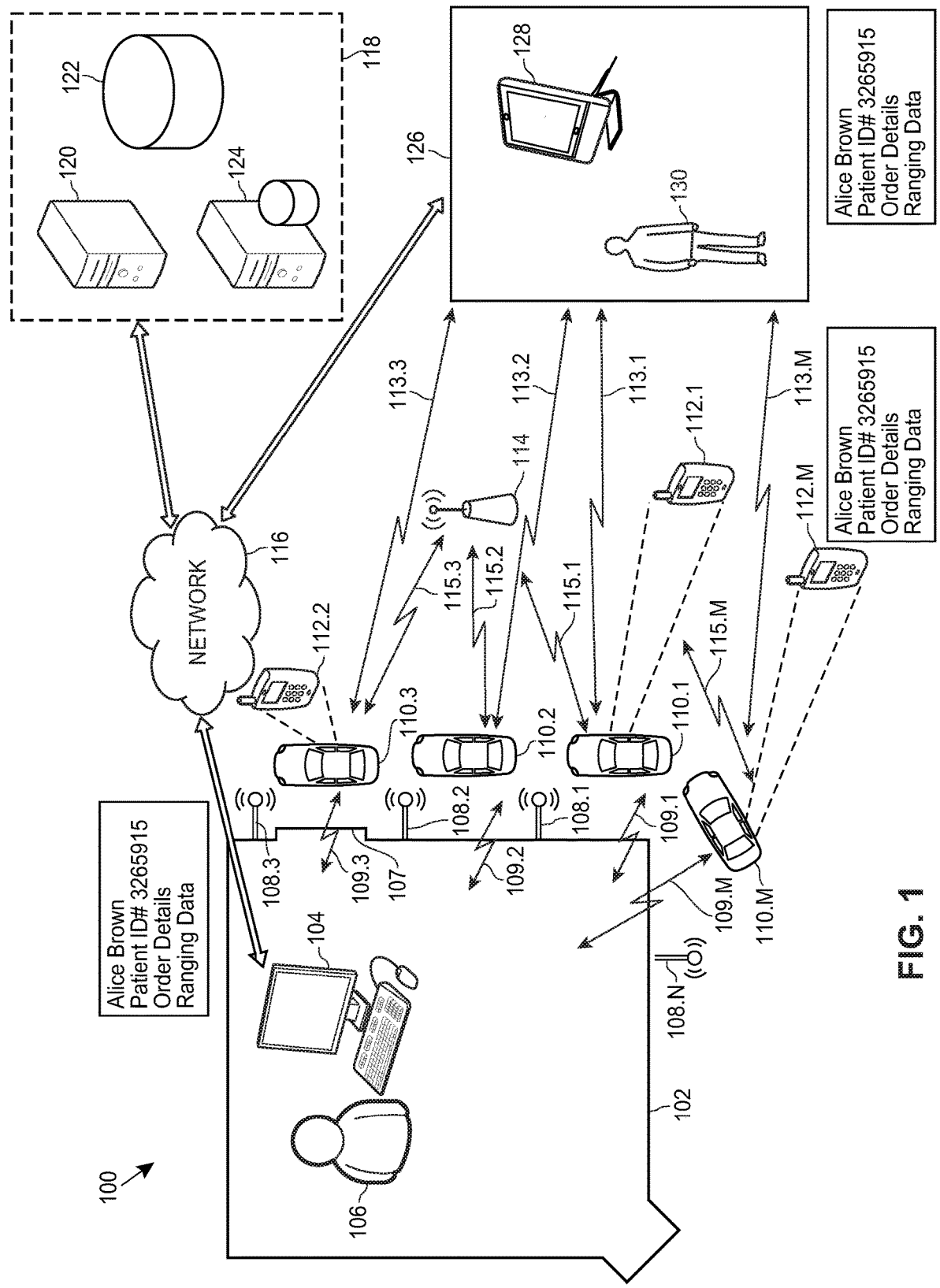
FIG. 1 illustrates a block diagram of an exemplary two-way communication system between personnel of a brick-and-mortar store and customers in an access area of the brick-and-mortar store.

FIG. 1 is a block diagram of an exemplary two-way communication system 100 in accordance with an embodiment of the present disclosure. Drive-thru pickup system 100 includes a store 102, a store computing device 104, which may be operated by a user 106, such as a store employee, for example and/or an offsite center 126, an offsite computing device 128, which may be operated by a user 130 such as an offsite employee, for example. Drive-thru pickup system 100 further includes 'N' number of transmitters 108.1-108.N, 'M' number of vehicles 110.1-

110.M and mobile computing devices 112.1-112.M, a base station 114, a communication network 116, and back-end components 118.

Two-way communication system 100 allows any suitable number of M customers to enter an access area, such as a drive-thru lane associated with brick-and-mortar store 102 within their respective vehicles (e.g., cars) 110.1-110.M. Boundaries of the access area are not shown in FIG. 1 for purposes of brevity, but may include any suitable type of system for directing vehicles through the access area. Each of the customers in vehicles 110.1-110.M may be associated with one of mobile computing devices 112.1-112.M.

Two-way communication system 100 may determine a location of each of the mobile devices 112.1-112.M in an access area of brick-and-mortar store 102, and therefore determine a position of each of the customers in the access area. Two-way computing system 100 may also determine information relevant to a customer associated with each mobile computing device 112.1-112.M. Upon determining the relevant information, two-way communication system may enable two-way communication between each customer and the personnel of brick-and-mortar store 102. As will be further discussed below, by determining information relevant to each customer associated with each of the mobile computing devices 112.1-112.M and enabling two-way communication between each customer and store personnel, two-way communication system 100 may increase speed and efficiency of access area service systems such as drive-thru systems and/or rapid pickup systems, for example.

Base station 114 may be configured to facilitate communications between one or more mobile computing devices 112.1-112.M and communication network 116 using any suitable number of wired and wireless links, such as links 115.1-115.M, for example. Although base station 114 is illustrated in FIG. 1 as wirelessly communicating with communication network 116, embodiments include base station 114 connecting to communications network 116 via any suitable number of wired and/or wireless links. For example, base station 114 may be coupled to communication network 116 via one or more landline, internet service provider (ISP) backbone connections, satellite links, a public switched telephone network (PSTN), etc. In various embodiments, base station 114 may be implemented as an access point (AP), a macrocell, a femtocell, etc.

Communication network 116 may include any suitable number of nodes, additional wired and/or wireless networks, etc., in various embodiments. For example, in an embodiment, communication network 116 may be implemented as a local area network (LAN), a metropolitan area network (MAN), a wide area network (WAN), or a suitable combination of local and/or external network connections. To provide further examples, communications network 116 may include wired telephone and cable hardware, satellite, cellular phone communication networks, etc. In various embodiments, communication network 116 may provide one or more mobile computing devices 112.1-112.M with connectivity to network services, such as internet services and/or access to one or more back-end components 118.

Store 102 may be any suitable type of store that services customers using an access area, such as a drive-thru. For example, in various embodiments, store 102 may be a brick-and-mortar store such as a restaurant or a pharmacy. Store 102 may have an associated access window 107, such as a drive-thru window, which may be used to allow store personnel to service customers in vehicles 110.1-110.M. For example, store personnel may process payments for customers and/or pass orders to customers through access window 107. Although FIG. 1 only shows a single access window 107, it will be appreciated by those of ordinary skill in the relevant art(s) that store 102 may include any suitable number of access windows 107. For example, store 102 may have one access window for accepting payments and a second access window to pass orders to customers. In various embodiments, store personnel, such as user 106, may engage in two-way communication with customers in vehicles 110.1-110.M using associated mobile devices 112.1-112.M while the customers are in an access area of store 102 but not necessarily at access window 107.

Offsite location 126 may be any suitable type of offsite center that services customers from an offsite or remote location. For example, in various embodiments, offsite location 126 may be a call center or a customer service center. In various embodiments, offsite personnel, such as user 128, may engage in two-way communication with customers in vehicles 110.1-110.M using associated mobile devices 112.1-112.M while the customers are in an access area of store 102 but not necessarily at access window 107.

Transmitters 108.1-108.N may be implemented as any suitable wireless communication device configured to transmit one or more signals in accordance with any suitable recurring schedule, such as once per every 10 seconds, once per 30 seconds, etc. In some embodiments, transmitters 108.1-108.N may be implemented as iBeacons, which have been developed by Apple, Inc. In various embodiments, transmitters 108.1-108.N may be mounted to a surface of store 102 (e.g., to an exterior wall) or otherwise permanently or semi-permanently mounted at various different predetermined locations throughout the access area, such as along a drive-thru lane, for example. For example, as shown in FIG. 1, transmitter 108.3 is located closer to access window 107 than transmitter 108.N.

Transmitters 108.1-108.N may be configured to store any suitable number of parameters, such as unique identifiers, location identifiers, and/or store identifiers, for example, and to transmit these parameters as part of each transmitter 108's respective transmission. As will be appreciated by those of ordinary skill in the relevant art(s), transmitters 108.1-108.N may be implemented with any suitable number of power sources, wireless transmitters, receivers, and/or transceivers, processors, memories, etc., to facilitate this functionality.

In various embodiments, transmitters 108.1-108.N may be configured to store their respective parameters in any suitable memory device utilized by each respective transmitter 108, such as a flash-based memory, a battery-backed RAM, etc. In some embodiments, transmitters 108.1-108.N may be configured to transmit signals including their respective parameters in accordance with any suitable communication protocol, such as IEEE Standards, for example. Examples of suitable communication protocols may include personal area network (PAN) protocols, (e.g., BLUETOOTH), Wi-Fi, radio frequency identification (RFID) and/or a near field communication (NFC) protocols.

In some embodiments, transmitters 108.1-108.N may be configured to operate in an "advertising mode" in which transmitters 108.1-108.N only transmit and to not otherwise receive communications. In other embodiments, transmitters 108.1-108.N may be configured to transmit their respective parameters as well as receive communications from other communication devices, such as mobile computing devices 112.1-112.M, for example. Embodiments in which transmitters 108.1-108.N operate in an advertising mode may be particularly useful when they are implemented as devices that utilize a battery power source, as such a configuration advantageously reduces power consumption.

In some embodiments, the transmitted parameters may include any suitable type of identifier. For example, a portion of the transmitted parameters could correspond to a particular store location and be common among all transmitters 108.1-108.N located at a single store, while another portion of the transmitted parameters may function to uniquely identify the location and/or identity of the respective transmitter 108.

For example, transmitters 108.1-108.M may be configured to transmit, as part of its respective parameters, a universally unique identifier (UUID). Transmitters 108.1-108.N may be configured to transmit their respective UUIDs in accordance with one or more standards utilized by iBeacon devices. For example, transmitters 108.1-108.N may transmit their respective UUIDs in accordance with a BLUETOOTH Low Energy (BLE) protocol, which implements the BLUETOOTH 4.0 specification at the time of this writing.

In various embodiments, the transmitted parameters may also include data representative of calibrated receive power information. For example, iBeacons broadcast a power value that is a calibrated received signal strength indicator (RSSI) measured 1 meter from the transmitter by a mobile computing device. By broadcasting this power value, another device (e.g., mobile computing devices 112.1-112.M) may compare the RSSI of a received beacon transmission to the calibrated value sent with the beacon transmission and use this ratio to estimate its proximity to the transmitter 108 transmitting the beacon.

Mobile computing devices 112.1-112.M may be configured to communicate with one or more of transmitters 108.1-108.N and/or to receive parameters transmitted from one or more of transmitters 108.1-108.N. In addition, mobile computing devices 112.1-112.M may be configured to communicate with store computing device 104 via one or more respective links 109.1-109.M and/or offsite computing device 128 via one or more respective links 113.1-113.M. Furthermore, mobile computing devices 112.1-112.M may be configured to communicate with store computing device 104, offsite computing device 128, and/or back-end components 118 via base station 114 and communication network 116 using one or more respective links 115.1-115.M. As will be appreciated by those of ordinary skill in the relevant art(s), mobile computing devices 112.1-112.M may be implemented with any suitable number of power sources, wireless transmitters, receivers and/or transceivers, processors, memories, etc., to facilitate this functionality.

In an embodiment, one or more of mobile computing devices 112.1-112.M may be implemented as a user equipment (UE), such as a smartphone, for example. Although mobile computing devices 112.1-112.M are illustrated in FIG. 1 as phones, one or more of mobile computing devices 112.1-112.M may be implemented as any suitable communication device configured to communicate with transmitters 108.1-108.N and communication network 116. For example, one or more of mobile computing devices 112.1-112.M may be implemented as a smartphone, a personal digital assistant (PDA), a tablet computer, a laptop computer, a wearable electronic device, etc.

One or more of mobile computing devices 112.1-112.M may be configured to communicate using any suitable number and type of communication protocols, such as Wi-Fi, cellular, BLUETOOTH, NFC, RFID, etc. For example, one or more of mobile computing devices 112.1-112.M may be configured to communicate with base station 114 using a first communication protocol to send data to and/or receive data from back-end components 114, store computing device 104, and/or offsite computing device 128 via communication network 116 using one or more of links 115.1-115.M. To continue this example, one or more of mobile computing devices 112.1-112.M may be configured to communicate with store computing device 104 using a second communication protocol to send data to and/or receive data from store computing device 104 using one or more of links 109.1-109.M. To further continue this example, one or more of mobile computing devices 112.1-112.M may be configured to communicate with offsite computing device 128 using a third communication protocol to send data to and/or receive data from offsite computing device 128 using one or more of links 113.1-113.M. In various embodiments, these first, second, and/or third communication protocols may be the same type or different types of communication protocols. To provide an illustrative example, one or more of mobile computing devices 112.1-112.M may communicate with back-end components 118 via base station 114 and communication network 116 via a cellular communication protocol using links 115.1-115.M, but communicate with store computing device 104 directly via a BLUETOOTH communication protocol using links 109.1-109.M.

One or more of mobile computing devices 112.1-112.M may be configured to execute an application installed thereon to facilitate one or more portions of the various embodiments described herein. For example, an application, which will be further discussed in detail below, may be downloaded and installed on one or more of mobile computing devices 112.1-112.M by each respective customer. The application may listen for signals transmitted by transmitters 108.1-108.M to determine whether the respective mobile computing device is within range of, and thus proximate to, one or more transmitters 108.1-108.M and therefore brick-and-mortar store 102.

In various embodiments, one or more of mobile computing devices 112.1-112.M may be configured to detect their proximity to one or more transmitters 108.1-108.M using any suitable proximity detection method. As will be appreciated by those of ordinary skill in the relevant art(s), proximity detection may be accomplished using any suitable known ranging methods, such as those described in accordance with the iBeacon standard, techniques implementing signal attenuation measurements, signal strength measurements, the use of propagation time of arrival (ToA) and time of departure (ToD) timestamps, etc.

Upon detection of its proximity to a transmitter 108.1-108.M, the application installed on one or more of mobile computing devices 112.1-112.M may cause the respective mobile computing device to perform one or more functions. That is, once a suitable application is installed on a mobile computing device 112, the application may cause that mobile computing device 112 to listen for transmissions from one or more transmitters 108.1-108.M, to determine whether that mobile computing device 112 is proximate to one or more transmitters 108.1-108.M, to receive parameters transmitted from one or more proximate transmitters 108.1-108.N, and/or to perform one or more functions with or without user intervention. The one or more functions that may be performed by the mobile computing device 112 upon detection of its proximity to a transmitter are further discussed in detail below.

Upon receiving a signal transmitted by one or more transmitters 108.1-108.M, one or more of mobile computing devices 112.1-112.M may generate ranging data based upon the strength of the received signal, such as an RSSI value, for example. In some embodiments, this ranging data may represent the actual measured signal strength value, such as a value in dBm, for example. In other embodiments, this ranging data may represent a scaled indication of the distance between a mobile computing device 112 receiving a signal from a proximate transmitter 108.

For example, in accordance with the current iBeacon standard as of this writing, one or more of mobile computing devices 112.1-112.M may compare the RSSI value of the received signal transmitted by a proximate transmitter 108 to the calibrated power value transmitted by the proximate transmitter 108 and use this ratio to calculate ranging data, such as an immediate range (e.g., one to two inches), a near range (3 to 6 feet), and a far range (greater than 30 feet).

In accordance with an embodiment, one or more of mobile computing devices 112.1-112.M may be configured to communicate this ranging data to back-end components 118, to store computing device 104, and/or to offsite computing device 128. The ranging data may be communicated, for example, as part of an application programming interface (API) services call. As will be appreciated by those of ordinary skill in the relevant art(s), the API call may be placed as part of an installed application function, which may run as background-running application. As a result, the API call may be advantageously placed without user intervention by being triggered upon mobile computing device 112 detecting its proximity to a transmitter 108.

Additionally or alternatively, one or more of mobile computing devices 112.1-112.M may be configured to send timestamp data indicative of when each of the transmissions was received from one or more transmitters 108.1-108.N. For example, one or more of mobile computing devices 112.1-112.M may log a timestamp of when a transmission was first received from one or more of transmitters 108.1-108.N and/or a timestamp associated with receiving any suitable number of subsequent transmissions. One or more of back-end components 118, retail computing device 104, and/or offsite computing device 128 may then utilize this timestamp data to calculate information such as customer dwell times and overall service times, which is further discussed in detail below.

Additionally or alternatively, one or more of mobile computing devices 112.1-112.M may be configured to communicate customer information indicative of the customer associated with the ranging data to back-end components 118, to retail computing device 104, and/or to offsite computing device 128. This customer information may include any suitable information to identify the customer so that the customer may be later matched to additional relevant customer information including order information and/or reason for visit information. For example, the customer information may include a customer's username, patient identification number, the customer's first and last name, etc.

Additionally or alternatively, one or more of mobile computing devices 112.1-112.M may be configured to communicate mobile device information identifying the mobile device associated with the ranging data to back-end components 118, to retail computing device 104, and/or to offsite computing device 128. This information may include any suitable information to identify the customer associated with the mobile device when the customer may not be logged on to the application of the mobile computing device but the application is running on the mobile computing device. For example, phone information may include a phone number. The customer may be later matched to additional relevant customer information including order information and/or reason for visit information.

In various embodiments, upon installing and launching the application on the customer's mobile computing device 112, the customer may be prompted to enter login information to access customer information from one or more back-end components 118. For example, the customer may initially create a customer profile with the retailer upon first launching the application, through a registration process via a website, over the phone, etc. This customer profile may include, for example, the customer's contact information, the customer's health insurance information, preferred forms of payment (e.g., credit card numbers), etc. As will be appreciated by those of ordinary skill in the relevant art(s), the customer may later access his customer profile by supplying this login information, which may include a username and password combination, for example.

In various embodiments, the customer's mobile computing device 112 may store this username and/or password data and transmit one or more portions of this data as the customer information. For example, as shown in FIG. 1, mobile computing device 112.1 may send data indicative of the customer "Alice Brown," along with her patient identification number and ranging data, to one or more back-end components 118. Upon sending the customer information to back-end components 118, store computing device 104, and/or offsite computing device 128, back-end components 118, store computing device 104, and/or offsite computing device 128 may subsequently correlate the received customer information to additional information relevant to the customer such as order pickup information and/or reason for visit information. For example, as will be further discussed below in more detail, the customer's pickup order information may be determined by correlating recently filled (or recently called in) prescription orders, which may also include the customer's name and/or patient ID, with the customer information. Additionally, for example, as will be further discussed below in more detail, the customer's reason for visit information may be determined by correlating the customer's account information, which may include changes to medical history or changes to health insurance, with the customer information.

Furthermore, back-end components 118, store computing device 104, and/or offsite computing device may also associate the ranging data with the identified customer. The customer information may also be communicated, for example, as part of the same API services call used for communicating the ranging data or a separate API services call. The API call may be advantageously placed without user intervention and may be triggered upon a mobile computing device 112 detecting its proximity to a transmitter 108.

In some embodiments (e.g., peer-to-peer mode embodiments) one or more mobile devices 112.1-112.M may communicate with one or more back-end components 118 to retrieve the customer's order information and/or reason for visit information once it has been identified by one or more back-end components 118. The one or more mobile computing devices 112.1-112.M may send the customer information, the customer's order information, the customer's reason for visit information, and/or the ranging data for each identified customer to store computing device 104 and/or offsite computing device 128. In this way, store computing device 104 and/or offsite computing device 128 may not communicate with one or more back-end components 118 to determine the position of each customer in the access area, their respective pickup order information, and/or their respective reason for visit information.

The one or more mobile computing devices 112.1-112.M may send the customer information, the customer's order information, the customer's reason for visit information and/or the ranging data for each identified customer to store computing device 104 and/or offsite computing device 128. In this way, store computing device 104 and/or offsite computing device 128 may not communicate with one or more back-end components 118 to determine the position of each customer in the access area, their respective pickup order information, and their respective reason for visit information.

In other embodiments (e.g., network communication mode embodiments) store computing device 104 and/or offsite computing device 128 may receive the customer's order information and/or the customer's reason for visit information once it has been identified by one or more back-end components 118. For example, as shown in FIG. 1 and previously discussed, mobile computing device 112.1 may send customer information regarding customer "Alice Brown," along with her patient identification number and ranging data, to one or more back-end components 118. Once one or more back-end components 118 correlates this information to stored data and retrieves information relevant to Alice's including, for example, pickup order details and/or account information details. One or more back-end components may send this information to store computing device 104 and/or offsite computing device 128.

In various embodiments, after the back-end components 118, store computing device 104, and/or offsite computing device 128, receives the customer information and ranging data, the back-end components 118, store computing device 104, and/or offsite computing device 128 may generate a notification including information relevant to the customer including the customer's order information and/or the customer's reason for visit information. The notification may be transmitted from back-end components 118, store computing device 104, and/or offsite computing device 128 to the one or more mobile computing devices 112.1-112.M. The information relevant to the customer may further include information identifying the brick-and-mortar store 102 at which the customer is waiting.

The mobile computing devices 112.1-112.M may display the notification and information further contained in the notification may allow the mobile computing devices 112.1-112.M to further enable contact with store personnel, for example user 106 at store computing device 104 and/or user 130 at offsite computing device 128. The mobile devices 112.1-112.M may be enabled to initiate a live chat session or a live audio session. In various embodiments, store computing device 104 and/or offsite computing device 128 may initiate contact with customers at mobile computing devices 112.1-112.M.

Back-end components 118 may include any suitable number of components configured to receive data from and send data to one or more of mobile computing devices 112.1-112.M, store computing device 104, and/or offsite computing device 128 via communication network 116 using any suitable number of wired and/or wireless links. In various embodiments, back-end components 118 may be configured to execute one or more applications to facilitate one or more embodiments as discussed herein. Back-end components 118 may include one or more external computing devices such as servers 120, databases 122, and/or database servers 124. Although FIG. 1 illustrates back-end components 118 as including only three different types of back-end components, those of ordinary skill in the relevant art(s) will appreciate that back-end components 118 may include any suitable number and type of back-end components to facilitate the appropriate functions of the embodiments as described herein.

For example, database server 124 may be implemented as any suitable number of servers that are configured to access data from database 122, which may store any suitable type of data as is further discussed in detail below. To provide another example, server 120 may be implemented as any suitable number of web servers configured to provide Internet communications to one or more of mobile computing devices 112.1-112.M, to process API service calls, and/or to support one or more applications installed on one or more of mobile computing devices 112.1-112.M. As will be appreciated by those of ordinary skill in the relevant art(s), back end components 118 may store and/or access secure data that is of a private, proprietary, and/or sensitive nature. As a result, various embodiments of back end components 118, communication network 116, retail computing device 104, offsite computing device 128, and/or one or more of mobile computing devices 112.1-112.M may implement appropriate security protocols such as encryption, secure links, network authentication, firewalls, etc., to appropriately protect such secure data.

Database 122 may be configured to store any suitable relevant data as described in the embodiments presented herein related to the operation of two-way communication system 100. Such data may include, for example, a customer profile that includes customer information, payment information, prescription information, etc. To provide additional examples, data stored in database 122 may include stock and/or inventory information, stock keeping units (SKUs), price information, store information such as store locations, store numbers, etc. One or more of back-end components 118 may communicate with database 122 to store data to and/or read data from database 122 as needed to facilitate the appropriate functions of the embodiments as described herein.

Again, the customer profile may include data that was initially entered by a customer. Additionally, the customer profile may also include data that was later added to the customer profile. For example, a customer may initially create a portion of a customer profile and, once created, additional data may be later added to the customer profile such as prescription information, health insurance information, coupons, promotions, etc.

The prescription information may include the type of prescription, the prescription dosage, prescription classification, whether the prescription is a narcotic, a controlled substance, or a drug that is otherwise subject to enhanced control due to its potential abuse. In some cases, laws may only allow a person to pick up their own prescription, and/or may require the customer to present photo identification. In such a case, the customer profile may include additional flags or information indicative of this.

The prescription information may include previously filled prescriptions called in by the customer's doctor and/or recently called in and unfilled prescriptions, which may be entered by pharmacy staff, for example. For example, upon a doctor calling in a prescription to the pharmacy, staff may update the customer profile to include prescription information such as prescription product, dosage, type, etc. In some embodiments, the prescription information may be added to the customer information profile stored in one or more back-end components 118 by store personnel via store computing device 104 and/or offsite computing device 128.

In other embodiments, the prescription information may be stored in store computing device 104 and/or offsite computing device 128.

The reason for visit information may include upcoming changes to health insurance information such as health insurance expiry or changes to patient history such as new allergies. In some embodiments, the reason for visit information may be added to a customer profile stored in one or more back-end components 118 by store personnel via store computing device 104 and/or offsite computing device 128. In other embodiments, the prescription information may be stored in store computing device 104 and/or offsite computing device 128.

In some embodiments, the customer may be picking up a prescribed pharmaceutical product refill. In such a case, the prescription information may include relevant information such as the number of available refills, an expiration of the number of refills, etc.

In other embodiments, the customer may additionally or alternatively be picking up a prescribed pharmaceutical product which is not a refill, including, for example, an initial supply of a prescribed pharmaceutical product which the customer has not used before. In such a case, the customer profile may include relevant information such as the customer's insurance information or other useful information to relay to the customer, such as side effects, instructions on how often to take the medication, allergy information, etc.

In embodiments in which the customer profile includes payment information, the customer may elect to register a default payment method, (e.g., a debit or credit card) so payments can be processed using the customer's stored payment information. For example, to make the drive-thru prescription pickup and payment process more convenient for the customer, a customer may register their identification, insurance information, and/or other applicable information with his customer profile so this information does not need to be initially provided in the access area (but may simply be verified) when the customer picks up the prescription at the access window. In such embodiments, payments may be processed before the customer picks up the prescription while waiting in the access area, at the access window, etc.

In some embodiments, store personnel or offsite personnel may contact a customer while the customer is waiting in an access area to pick up a prescription to relay to the customer, information such as side effects, instructions on how often to take the medication, allergy information, etc. In various embodiments, store personnel or offsite personnel may contact a customer while the customer is waiting in an access area to inquire about changes to account information such as changes to allergy information or health insurance information.

In some embodiments, a customer may be notified while in the access area that she may contact store personnel. The notification may be generated at one or more back-end components 118, store computing device 104, and/or offsite computing device 128 and transmitted to one or more mobile devices 112.1-112.M.

Store computing device 104 and/or offsite computing device 128 may be configured to communicate with back-end components 118 and/or with one or more of mobile computing devices 112.1-112.M via any suitable number of wired and/or wireless links to send data to and/or receive data from with back-end components 118 and/or one or more of mobile computing devices 112.1-112.M. Again, store computing device 104 and/or offsite computing device 128 may communicate with one or more of mobile computing devices 112.1-112.M directly via links 109.1-109.M using a first communication protocol (e.g., BLUETOOTH) and with back-end components 118 using a second communication protocol (e.g., a Transmission Control Protocol (TCP) and Internet Protocol (IP)), which may be different than or the same as the second communication protocol.

In an embodiment, store computing device 104 and/or offsite computing device 128 may be implemented as a specialized and/or proprietary user equipment (UE), such as a pharmacy terminal computer, for example. Although store computing device 104 and/or offsite computing device 128 are illustrated in FIG. 1 as a terminal computer system, store computing device 104 and/or offsite computing device 128 may be implemented as any suitable computing device configured to communicate with one or more mobile computing devices 112.1-112.M and/or back-end components 118. For example, store computing device 104 and/or offsite computing device 128 may be implemented as a smartphone, a personal digital assistant (PDA), a tablet computer, a laptop computer, a wearable electronic device, etc.

In some embodiments, store computing device 104 and/or offsite computing device 128 may be configured to operate in a standalone mode without having to communicate with back-end components 118. In accordance with such embodiments, store computing device 104 and/or offsite computing device 128 may receive customer information, ranging data, customer prescription pickup order information, and/or customer reason for visit information from one or more mobile computing devices 112.1-112.M and to display a relative position of each customer in the access area, their prescription pickup order, and/or their reason for visit using this information. Additionally or alternatively, store computing device 104 and/or offsite computing device 128 may locally store the customer prescription pickup order information and may not receive this information from one or more mobile computing devices 112.1-112.M.

In standalone embodiments, store computing device 104 and/or offsite computing device 128 may communicate in a peer-to-peer mode with one or more mobile computing devices 112.1-112.M (e.g., via links 109.1-109.M or links 113.1-113.M) in accordance with such embodiments so that a common back-end application is not needed. In peer-to-peer mode embodiments, store computing device 104 and/or offsite computing device 128 may have a locally stored list of unfilled prescriptions and/or recently filled prescriptions from called in prescription orders as well as account information including changes in health history and/or health insurance information. Store computing device 104 and/or offsite computing device 128 may receive customer information and ranging data from one or more of mobile computing devices 112.1-112.M. The ranging data may be used to determine a position of the customer's mobile computing device 112.1-112.M, while the customer information may be used to associate the customer with one of the locally stored prescription orders. Store computing device 104 and/or offsite computing device 128 may display this information on a suitable display such that each customer's position in an access area, his associated prescription information, and his associated reason for visit information are displayed.

In other embodiments, store computing device 104 and/or offsite computing device 128 may communicate in a network communications mode to utilize a back-end application by communicating with one or more of back-end components 118 via communication network 116. In accordance with such embodiments, store computing device 104 and/or offsite computing device 128 may access the prescription information stored in one or more of back-end components 118, which may include the name of the prescription customer. Additionally or alternatively, store computing device 104 and/or offsite computing device 128 may access portions of the customer's profile from back-end components 118, such as customer contact information, payment information, etc. store computing device 104 and/or offsite computing device 128 may communicate with one or more back-end components 118 to retrieve a list of unfilled prescriptions and/or recently filled prescriptions from called in prescription orders. Store computing device 104 and/or offsite computing device 128 may receive customer information and ranging data stored in one or more back-end components 118 sent from one or more of mobile computing devices 112.1-112.M. Again, the ranging data may be used to determine a position of the customer's mobile computing device 112, while the customer information may be used to associate the customer with locally stored information relevant to the customer. Store computing device 104 and/or offsite computing device 128 may display this information on a suitable display such that each customer's position in an access area, his associated prescription pickup order information, and his associated reason for visit information are displayed.

In network communications mode embodiments, store computing device 104 and/or offsite computing device 128 may utilizes a back-end application to advantageously access additional information that may be stored in one or more of back-end components 118, to offload processing, to process payments, etc. In embodiments in which payments are processed in such a manner, the customers may not need to pay for their prescriptions at access window 107, further increasing the speed and efficiency of two-way communication system 100.

In both peer-to-peer mode and network communications mode embodiments, back-end components 118, store computing device 104, and/or offsite computing device 128 may continuously retrieve ranging data and/or customer information to update the position of customer vehicles as new customers enter the access area and as serviced customers exit the access area. As will be appreciated by those of ordinary skill in the relevant art(s), the ranging data and/or customer information may be polled at any suitable time interval to provide an appropriate level of feedback to retail store personnel utilizing store computing device 104 and/or offsite computing device 128.

Furthermore, back-end components 118, store computing device 104, and/or offsite computing device 128 may be configured to calculate dwell times and/or service times based upon the timestamp data reported by one or more of mobile computing devices 112.1-112.M. For example, by referencing the ranging data with the timestamp data, a determination may be made regarding how long a customer was at the same position in the access area. To provide an illustrative example, if mobile computing device 112.1 sends ranging data that does not change more than a threshold value (e.g., 3 dBm, 5 dBm, etc.) that is timestamped every 10 seconds, then the cumulative time in which the ranging data did not change by the threshold amount may be considered a dwell time that vehicle 110.1 was stationary in the access area.

In addition, back-end components 118 store computing device 104, and/or offsite computing device 128 may be configured to calculate overall service times using the initially reported timestamp sent from one or more of mobile computing devices 112.1-112.M, which may correspond to the earliest recorded time that the customer entered the access area. By using another time reference, such as a timestamp associated with when the customer's payment was processed, for example, an overall customer service time may be calculated. As will be appreciated by those of ordinary skill in the relevant art(s), the dwell time and service time data may be used to reveal valuable information regarding the speed and efficiency of a particular drive-thru system.

Figure 2:
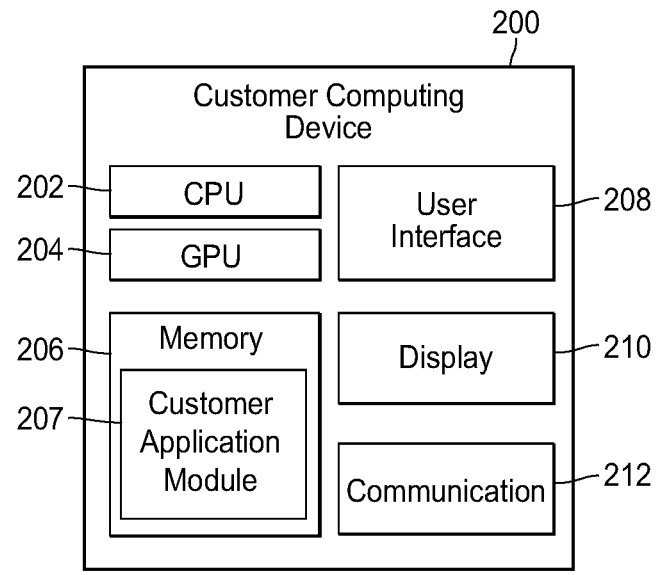
FIG. 2 illustrates a block diagram of an exemplary computing device of a customer.

FIG. 2 is a block diagram of an exemplary customer computing device 200, according to an embodiment. In an embodiment, customer computing device 200 may be an implementation of any of mobile computing devices 112.1-112.M, for example, as shown in FIG. 1. Customer computing device 200 may be implemented as a user equipment (UE), such as a mobile computing device, a smartphone, a laptop computer, tablet computer, desktop computer, or any other suitable type of computing device. Customer computing device 200 may include a central processing unit (CPU) 202, a graphics processing unit (GPU) 204, a memory 206, a user interface 208, a display 210, and a communication unit 212.

CPU 202 and/or GPU 204 may be configured to communicate with memory 206 to store to and read data from memory 206. In accordance with various embodiments, memory 206 may be a computer-readable non-transitory storage device that may include any combination of volatile (e.g., a random access memory (RAM), or non-volatile memory (e.g., battery-backed RAM, FLASH, etc.). Memory 206 may be configured to store instructions executable on CPU 202 and/or GPU 204. These instructions may include machine readable instructions that, when executed by CPU 204 and/or GPU 204, cause CPU 202 and/or GPU 204 to perform various acts. Memory 206 may also be configured to store any other suitable data, such as customer information, ranging data, timestamp information, etc.

In various embodiments, CPU 202 and/or GPU 204 may be configured to determine a current time from a real-time clock circuit and/or by receiving a network time via communication unit 212 (e.g., via base station 114). Furthermore, various embodiments include CPU 202 and/or GPU 204 maintaining a running clock and/or a timer. In various embodiments, CPU 202 and/or GPU 204 may reference this running clock and/or timer to generate timestamps and to store generated timestamps in a suitable portion of memory 206. For example, CPU 202 and/or GPU 204 may generate a timestamp when a signal transmission is received from one or more transmitters (e.g., transmitters 108.1-108.M), which may in turn be transmitted by communication unit 212 with customer information and/or ranging data.

Customer application module 207 is a portion of memory 206 configured to store instructions, that when executed by CPU 202 and/or GPU 204, cause CPU 202 and/or GPU 204 to perform various acts in accordance with applicable embodiments as described herein. For example, in various embodiments, instructions stored in customer application module 207 may facilitate CPU 204 and/or GPU 204 to perform functions such as, for example, listening for transmissions from one or more transmitters (e.g., transmitters 108.1-108.M), determining whether customer computing device 200 is proximate to one or more transmitters, receiving one or more parameters transmitted from one or more transmitters, generating timestamps associated with when a transmitter is located proximate to customer computing device 200 and/or when transmitted parameters are received, measuring the signal strength of transmitter transmissions, to generate ranging data, transmitting the ranging data and/or customer information stored in memory 206 to another device via communication unit 212 (e.g., to store computing device 104, offsite computing device 128, and/or one or more back-end components 118), receiving a notification from another device via communication unit 212 (e.g., to store computing device 104, offsite computing device 128, and/or one or more back-end components 118), displaying one or more interactive icons via display 210, receiving user input via user interface 208, communicating with external computing devices (e.g., store computing device 104, offsite computing device 128, and/or one or more back-end components 118), etc.

As will be appreciated by those of ordinary skill in the relevant art(s), CPU 202 and/or GPU 204 may access instructions stored in customer application module 207 to implement any suitable number of routines, algorithms, applications, programs, etc., to facilitate the functionality as described herein with respect to the applicable embodiments.

In some embodiments, the information and/or instructions stored in customer application module 207 may be setup upon the initial installation of a corresponding application. In such embodiments, the application may be installed in addition to an operating system implemented by customer computing device 200. For example, a user may download and install the application from an application store via communication unit 212 in conjunction with user interface 208. Application stores may include, for example, Apple Inc.'s App Store, Google Inc.'s Google Play, Microsoft Inc.'s Windows Phone Store, etc., depending on the operating system implemented by customer computing device 200.

In other embodiments, the information and/or instructions stored in customer application module 207 may be integrated as a part of the operating system implemented by customer computing device 200. For example, a user could setup the application via an initial setup procedure upon initialization of customer computing device 200, as part of setting up a new user account on customer computing device 200, etc.

Upon execution of customer application module 207, CPU 202 and/or GPU 204 may run one or more foreground and/or background processes. For example, customer application module 207 may cause GPU 204 to display a corresponding interactive icon on display 210. A user may launch, or execute, the application associated with application module 207 by performing an appropriate gesture, such as tapping his finger on an interactive portion of display 210 to open the application. Upon launching the application in this way, a user may enter her login credentials to be connected to one or more store computing device 104, one or more offsite computing device 128, and/or one or more back-end components 118 and view and/or edit details associated with her customer profile, which may optionally be stored in any suitable portion of memory 206.

The application may execute one or more background processes. For example, customer computing device 200 may actively listen for transmissions without user intervention in accordance with a certain communication protocol, as indicated by the instructions in customer application module 207. Furthermore, the application may execute a background running process and, without user intervention, cause customer computing device 200 to determine whether customer computing device 200 is proximate to one or more transmitters, to receive one or more parameters transmitted from one or more transmitters, to generate timestamps associated with when a transmitter is located proximate to customer computing device 200 and/or when transmitted parameters are received, to measure the signal strength of transmitter signal transmissions, to generate ranging data, and/or to transmit the ranging data stored in memory 206 to another device via communication unit 212 (e.g., to store computing device 104, offsite computing device 128, and/or one or more back-end components 118).

If the user has entered her login credentials in customer application module 207, customer information may also be accessed (e.g., from mobile computing devices 112.1-112.M and/or one or more back-end components 118) and transmitted to another device (e.g., to store computing device 104, offsite computing device 128, and/or one or more back-end components 118). Customer information may include the customer's name, identification number, address, phone number, etc. If the user has not entered her login credentials in customer application module 201, phone information may be transmitted to another device (e.g., to store computing device 104, offsite computing device 128, and/or one or more back-end components 118). Phone information may include a phone number.

User interface 208 may be configured to facilitate user interaction with customer computing device 200. For example, user interface 210 may include a user-input device such as an interactive portion of display 212 (e.g., a "soft" keyboard displayed on display 212), an external hardware keyboard configured to communicate with customer computing device 200 via a wired or a wireless connection (e.g., a BLUETOOTH keyboard), an external mouse, or any other suitable user-input device.

Display 210 may be implemented as any suitable type of display that may facilitate user interaction, such as a capacitive touch screen display, a resistive touch screen display, etc. In various aspects, display 210 may be configured to work in conjunction with user-interface 208, CPU 202, and/or GPU 204 to detect user inputs upon a user selecting a displayed interactive icon or other graphic, to identify user selections of objects displayed via display 210, etc.

In various embodiments, a customer may engage in two-way communication at the display 210 of customer computing device 200 such as mobile computing devices 112.1-112.M. The customer may initiate communication and/or receive an indication that communication has been initiated. Two-way communication may be for example, a live audio communication and/or a live chat communication. In some embodiments, two-way communication may be between communication unit 312 of personnel device 300 such a store computing device 104 or offsite computing device 128 and communication unit 212 of customer computing device such as mobile computing devices 112.1-112.M, as shown in FIG. 1. To provide another example, in other embodiments, two-way communication may be between communication unit 312 of mobile device 300 such a store computing device 104 or offsite computing device 128 and communication unit 212 of customer computing device such as mobile computing devices 112.1-112.M, as shown in FIG. 1 via one or more back-end components 118 and communication network 116.

Communication unit 212 may be configured to facilitate communication between customer computing device 200 and one or more external computing devices, such as one or more of back-end components 118, store computing device 104, and/or offsite computing device 128 for example, as shown in FIG. 1. As will be appreciated by those of ordinary skill in the relevant art(s), communication unit 212 may be implemented with any combination of suitable hardware and/or software to enable these functions. For example, communication unit 212 may be implemented with any number of wired and/or wireless transceivers, antennas, network interfaces, physical layers (PHY), etc. Communication unit 212 may facilitate communications between customer computing device 200 and one or more networks, such as communications network 116, for example, as shown in FIG. 1. Communication unit 212 may be configured to utilize any suitable number and type of communication protocols. Examples of suitable communication protocols may include, for example, cellular communication protocols, Wi-Fi communication protocols, BLUETOOTH communication protocols, NFC communication protocols, RFID communication protocols, etc.

Customer computing device 200 may communicate in accordance with any suitable number and type of communication modes, and may be configured to communicate in these different types of communication modes at the same time. For example, Customer computing device 200 may communicate in a peer-to-peer mode and a network communication mode at the same time, or at separate times. To provide an illustrative example, Customer computing device 200 may communicate with an external computing device directly in a peer-to-peer mode (e.g., store computing device 104 or offsite computing device 128) and communicate with one or more back-end components (e.g., back-end components 118) in a network communication mode (e.g. via base station 114 and communication network 116)

In various embodiments, communication unit 212 may be configured to measure the strength of signals transmitted by one or more transmitters 108.1-108.M and to provide these measurements to CPU 202. In this way, communication unit 212 may facilitate CPU 202 generating ranging data.

Although each of the components in FIG. 2 are illustrated as separate units or modules, those of ordinary skill in the relevant art(s) will appreciate that any components integrated as part of customer computing device 200 shown in FIG. 2 may be combined and/or share functionalities. For example, CPU 202, GPU 204, and memory 206 may be integrated as a single processing unit. Furthermore, although connections are not shown between the individual components of customer computing device 200, those of ordinary skill in the relevant art(s) will appreciate that customer computing device 200 may implement any suitable number of wired and/or wireless links to facilitate communication and interoperability between these components. For example, memory 206, communication unit 212, and/or display 210 may be coupled via wired buses and/or wireless links to CPU 202 and/or GPU 204 to facilitate communications between these components and to enable these components to accomplish their respective functions as described throughout the present disclosure. Furthermore, although FIG. 2 illustrates a single memory 206, those of ordinary skill in the relevant art(s) will appreciate that customer computing device 200 may implement any suitable number and/or combination of memory systems.

Figure 3:
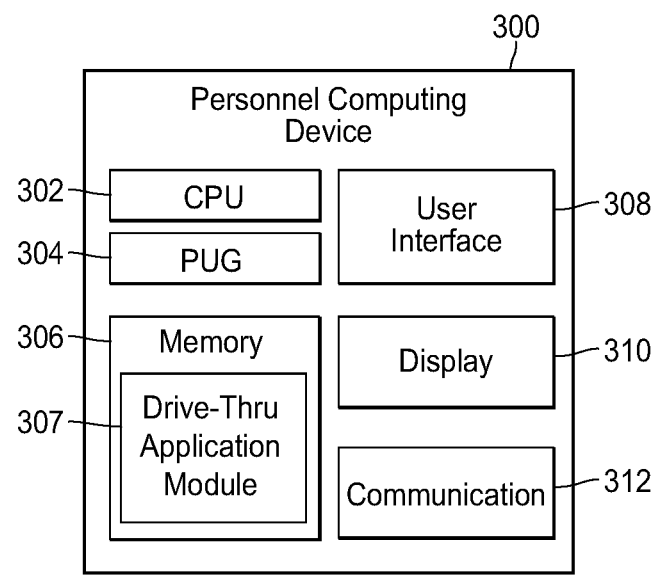
FIG. 3 illustrates a block diagram of an exemplary computing device of store personnel.

FIG. 3 is a block diagram of an exemplary personnel computing device 300, according to an embodiment. In various embodiments, personnel computing device 300 may be an implementation of store computing device 104 or an implementation of offsite computing device 128, for example, as shown in FIG. 1. In an embodiment, personnel computing device 300 may be implemented as a user equipment (UE), such as a mobile computing device, a smartphone, a laptop computer, a tablet computer, a desktop computer, or any other suitable type of computing device. Personnel computing device 300 may include a CPU 302, a GPU 304, a memory 306, a user interface 308, a display 310, and a communication unit 312.

CPU 302, GPU 304, memory 306, user interface 308, display 310, and communication unit 312 may be substantially similar implementations of, and perform substantially similar functions as, CPU 202, GPU 204, memory 206, user interface 208, display 210, and communication unit 212, respectively, as shown in FIG. 2. Therefore, only differences between CPU 302, GPU 304, memory 306, user interface 308, display 310, communication unit 312, and CPU 202, GPU 204, memory 206, user interface 208, display 210, and communication unit 212, respectively, will be further discussed herein.

Personnel application module 307 is a portion of memory 306 configured to store instructions, that when executed by CPU 302 and/or GPU 304, cause CPU 302 and/or GPU 304 to perform various acts in accordance with applicable embodiments as described herein. For example, in various embodiments, instructions stored in personnel application module 307 may facilitate CPU 302 and/or GPU 304 to perform functions such as, for example, receiving customer information, customer pickup order information, customer reason for visit information, ranging data, and/or timestamps from one or more other computing devices via communication unit 314. For example, in some embodiments, the customer information, customer pickup order information, customer reason for visit information, ranging data, and/or timestamps may be received via communication unit 312 directly from one or more of mobile computing devices 112.1-112.M, as shown in FIG. 1. To provide another example, in other embodiments, the customer information, customer pickup order information, customer reason for visit information, ranging data, and/or timestamps may be transmitted from one or more of mobile computing devices 112.1-112.M, as shown in FIG. 1, to one or more back-end components 118 and received via communication unit 312 via communication network 116.

As will be appreciated by those of ordinary skill in the relevant art(s), CPU 302 and/or GPU 304 may access instructions stored in personnel application module 307 to implement any suitable number of routines, algorithms, applications, programs, etc., to facilitate the functionality as described herein with respect to the applicable embodiments.

To provide yet another example, in still other embodiments, any suitable combination of the customer information, customer pickup order information, customer reason for visit information, ranging data, and/or timestamps may be transmitted from one or more of mobile computing devices 112.1-112.M and/or stored in one or more back-end components 118, as shown in FIG. 1. In such a case, personnel application module 307 may facilitate CPU 304 and/or GPU 304 receiving, via communication unit 312, customer information, customer pickup order information, reason for visit, ranging data, and/or timestamps via any suitable combination of direct communications between (i) personnel computing device 300 and one or more mobile computing devices 112.1-112.M and/or (ii) network communications between personnel computing device 300, one or more back-end components 118, and/or one or more mobile computing devices 112.1-112.M.

In various embodiments, a store personnel may engage in two-way communication at the display 310 of personnel computing device 300 such as store computing device 104 or offsite computing device 128. Personnel computing device 300 such as store computing device 104 and/or offsite computing device 128 may generate and transmit to customer computing device 200 such as mobile devices 112.1-112.M a notification indicating that two-way communication is available and containing at least a portion of information relevant to a customer. Additionally, backend components 118 may generate and transmit to customer computing device 200 such as mobile devices 112.1-112.M a notification indicating that two-way communication is available and containing at least a portion of information relevant to a customer. Two-way communication may be, for example, a live audio session and/or a live chat session.

In some embodiments two-way communication may be between communication unit 312 of mobile device 300 such a store computing device 104 or offsite computing device 128 and communication unit 212 of customer computing device such as mobile computing devices 112.1-112.M, as shown in FIG. 1. To provide another example, in other embodiments, two-way communication may be between communication unit 312 of mobile device 300 such a store computing device 104 or offsite computing device 128 and communication unit 212 of customer computing device such as mobile computing devices 112.1-112.M, as shown in FIG. 1 via one or more back-end components 118 and communication network 116.

In some embodiments, the information and/or instructions stored in personnel application module 307 may be setup upon the initial installation of a corresponding application. In such embodiments, the application may be installed in addition to an operating system implemented by personnel computing device 300. For example, a user may download and install the application from an application store via communication unit 312 in conjunction with user interface 308. Application stores could include, for example, Apple Inc.'s App Store, Google Inc.'s Google Play, Microsoft Inc.'s Windows Phone Store, etc., depending on the operating system implemented by drive-thru computing device 300.

In other embodiments, the information and/or instructions stored in personnel application module 307 may be integrated as a part of the operating system implemented by personnel computing device 300. For example, a user could setup the application via an initial setup procedure upon initialization of personnel computing device 300, as part of setting up a new user account on personnel computing device 300, etc.

In various embodiments, personnel computing device 300 may determine each customer's position in line from ranging data transmitted from each of the customer's respective mobile computing device (e.g., mobile computing devices 112.1-112.M). That is, upon execution of drive-thru application module 307, CPU 302 and/or GPU 304 may associate the customer information and ranging data sent from each customer's mobile computing device (e.g., mobile computing device 112) to determine a position of each customer in an access area such as the drive-thru lane. For example, referring back to FIG. 1, ranging data sent by mobile computing device 112.1 and 112.2 may indicate a greater range between mobile computing device 112.1 and transmitter 108.3 than between mobile computing device 112.2 and transmitter 108.3. Because personnel computing device 300 may also receive customer information from each of mobile computing devices 112.1 and 112.2, CPU 302 and/or GPU 304 may determine that the customer in vehicle 110.3 is ahead of the customer in vehicle 110.1 in a drive-thru lane and display an appropriate indication on display 310.

In some embodiments, personnel computing device 300 may calculate these positions locally from the ranging data. In other embodiments, one or more back-end components (e.g., back-end components 118) may calculate the position of each customer and send this position data to drive-thru computing device 300. In this way, drive-thru computing device 300 may offload the position calculations to the one or more back-end components. The term "ranging data," as used herein may therefore encompass any information suitable for identifying the position of each customer within the drive-thru lane, such as signal strength data (e.g., RSSI values), scaled range information (e.g., near, intermediate, far, etc.) and/or the actual positions calculated from one or more of the signal strength data and/or scaled range information.

In addition, upon execution of personnel application module 307, CPU 302 and/or GPU 304 may match the customer information to one or more customer prescription pickup orders or reasons for visit. For example, CPU 302 and/or GPU 304 may compare any portion of the customer information sent from the customer's mobile computing device to computing device 300, such as the customer's name, patient ID, etc., to the customer's prescription information associated with recently filled (or recently called in) prescription orders, aspects of the customer's account information such as health insurance information which may also include the customer's name and/or patient ID.

Continuing to use FIG. 1 as an example, in some (e.g., network communication mode) embodiments, personnel application module 307 may cause CPU 302 and/or GPU 304 to communicate with one or more back-end components 118 to retrieve the customer's prescription information or reason for visit by correlating the received customer information to customer information stored with the customer's prescription information or account information in one or more back-end components 118.

However, in other (e.g., peer-to-peer mode) embodiments, personnel application module 307 may cause CPU 302 and/or GPU 304 to communicate with one or more mobile computing devices 112.1-112.M to retrieve the customer's prescription information, or reason for visit which may be sent from the one or more mobile computing devices 112.1-112.M after being retrieved by the one or more mobile computing devices 112.1-112.M from one or more back-end components 118.

Upon execution of personnel application module 307, CPU 302 and/or GPU 304 may determine additional drive-thru service time metrics, such as dwell times and total service times, as previously discussed with reference to FIG. 1. As will be appreciated by those of ordinary skill in the relevant art(s), dwell time and/or service time calculations may be stored locally in any suitable portion of memory 306 and/or may be sent to and stored in one or more back-end components 118.

Storing the dwell time and/or service time calculations in one or more back-end components 118 may advantageously allow several retail drive-thru locations implementing the drive-thru system as described herein to utilize one or more back-end components 118 as a repository for these calculations. In this way, one or more back-end components 118 may store an aggregation of dwell time and/or service time calculations across several stores. In accordance with such embodiments, CPU 302 and/or GPU 304 may be configured to label the dwell time and/or service time calculations with a suitable identifier of the drive-thru service location, such as a store number, for example, upon being stored in one or more back-end components 118. As a result, the appropriate personnel may compare the performance of several retail drive-thru locations by their respective identifiers.

Furthermore, CPU 302 and/or GPU 304 may be configured to perform additional analytics on the dwell time and/or service time calculations. For example, the dwell time and/or service time calculations may be sorted into respective time-of-day and/or day-of-week time slots according to one or more timestamps. The time-of-day and/or day-of-week time slots may be grouped according to, for example, timestamps indicating when each customer's prescription pickup order was processed, when each customer's respective mobile computing device initially detected a signal transmission indicating its proximity to a transmitter, etc.

For example, the dwell time and/or service time calculations may be grouped according to a 4 hour slot of service time each individual day, for a total of 42 unique time slots for each week. To provide another example, the dwell time and/or service time calculations may be grouped according to a 4-hour slot of service time Monday through Friday and a separate 4-hour slot of service time on weekends, thereby grouping the dwell time and/or service time calculations into 6 unique weekday time slots and 6 unique weekend time slots. As will be appreciated by those of ordinary skill in the relevant art(s), any suitable grouping and granularity of time slots may be used based upon a location of the drive-thru, peak service times, etc.

Using the time-slot grouped dwell time and/or service time calculations, an average service time may be determined on a per-store and per-time slot basis. For example, service times may be collected from multiple customers that were serviced in the same time slot at the same retail store drive-thru location and averaged. For example, a first set of dwell time and/or service time calculations may be averaged over all customers serviced between 8 AM to noon Wednesday-Friday, while a second set of dwell time and/or service time calculations may be averaged over all customers serviced between 8 AM and noon Saturday and Sunday.

In some embodiments, CPU 302 and/or GPU 304 (or one or more back-end components, such as, e.g., back-end components 118) may use these average service times to predict a new customer's overall service time by first estimating which time slot a new customer will fall into upon arriving at the drive-thru location. Then, CPU 302 and/or GPU 304 (or one or more back-end components, such as, e.g., back-end components 118) may correlate that time slot to its respective average service time. In various embodiments, this estimate may be provided to the customer via her respective mobile computing device in accordance with a function of the respective application installed thereon.

FIG. 4A is a block diagram of an exemplary set of ranging data 400 used to determine customer locations within an access area of a brick-and-mortar store such as a drive-thru lane using a single transmitter, according to an embodiment. FIG. 4A illustrates a tabular view of a sample of customer information and ranging data that may be received at personnel computing device 300. Again, the customer information and ranging data shown in FIG. 4A may be received at personnel computing device 300 directly (peer-to-peer mode) or indirectly (network communication mode) from one or more mobile computing devices, such as mobile computing devices 112.1-112.M, for example, as shown in FIG. 1.

The data shown in FIGS. 4A-B may be updated over several subsequent time intervals as additional ranging data is received for the same set of customers. Furthermore, additional customers may enter the access area and their respective mobile computing devices may subsequently report additional customer information and ranging data that is not shown in FIG. 4A. For purposes of brevity, the customer information and ranging data shown in FIGS. 4A-B is representative of data received within a single time interval.

As shown in FIG. 4A, each customer's respective identification number is shown along with the respective ranging data sent from each customer's respective mobile computing device. The ranging data shown in FIG. 4A may be an example of ranging data transmitted by a set of mobile computing devices corresponding to vehicles 110.1-110.3, as shown in FIG. 1, over a single time interval.

Because each transmitter is associated with a known, or predetermined, location with respect to the front of the access area, personnel computing device 300 may sort the customer's position in order of decreasing ranging data to determine a position of each customer with respect to one another. In the example shown in FIG. 4A, the closest transmitter as shown in FIG. 1 is transmitter 108.3, so the closest customer is the customer associated with the ranging data having the highest value, or the customer in car 110.3, followed by the customer in car 110.2, and then the customer in car 110.1.

FIG. 4B is a block diagram of an exemplary set of ranging data 450 used to determine customer locations within an access area using multiple transmitters, according to an embodiment. As shown in FIG. 4B, personnel computing device 300 may receive ranging data from one or more mobile computing devices within range of more than one transmitter at the same time. Because each mobile computing device may be configured to send a unique transmitter identifier with the ranging data, personnel computing device 300 may additionally sort received ranging data on a per-mobile computing device and a per-transmitter basis.

As shown in FIG. 4B, each of the customer's respective mobile computing device sends ranging data for each of transmitters 108.1, 108.2, and 108.3. As will be appreciated by those of ordinary skill in the relevant art(s), signals transmitted by one or more transmitters 108 may be subject to interference, multi-path distortion, lack of line-of sight, etc., that may impact the accuracy of the ranging data. As a result, in some embodiments, personnel computing device 300 may determine a position of each customer in the drive-thru lane by comparing the received ranging data with respect to more than one transmitter.

Again, because each transmitter is associated with a known, or predetermined, location with respect to the front of the access area such as a drive-thru lane, personnel computing device 300 may sort the customer's in order of decreasing ranging data to determine a position of each customer with respect to one another. In the example shown in FIG. 4B, although the closest transmitter is transmitter 108.3, the ranging data associated with each customer's mobile computing device in vehicles 110.1 and 110.2 are within 2 dBm of one another. Because other factors may account for such a difference in ranging data, using only the ranging data for transmitter 108.3 may not provide an accurate location of the position of each of the customers in vehicles 110.1, 110.2, and 110.3 within the access area.

Therefore, personnel computing device 300 may utilize ranging data from additional transmitters, such as transmitters 108.2 and 108.3, for example, to determine that the customer's mobile computing device in vehicle 110.2 is closer to transmitter 108.2 than the customer's mobile computing device in vehicle 110.1. As a result, personnel computing device 300 may accurately sort the positions of each of the customers in the drive-thru line. As will be appreciated by those of ordinary skill in the relevant art(s), personnel computing device 300 may utilize any suitable technique to interpret the ranging data from multiple transmitters to calculate a position of each mobile computing device, and therefore each customer, in the access area.

In various embodiments, two-way communication with a customer associated with each mobile computing device according to the position of the each mobile computing device in an access area. For example, two-way communication may be established with customers closer to a window of the access area, for example a drive-thru lane before customers farther away.

In various embodiments, ranging data from one or more mobile computing devices may be within some threshold value indicating that the one or more mobile devices are located in the same vehicle. The ranging data may be from one or more transmitter. A primary mobile device associated with each vehicle may be determined by access the customer profile associated with each mobile device. For example, order pickup information or a reason for visit may indicate which customer is likely to need service. In various embodiments, two-way communication may be established at the primary mobile device with the customer associated with that device.

As will be appreciated by those of ordinary skill in the relevant art(s), a position of each mobile computing device and therefore each customer may also be determined using ranging data at the back-end components 118 and transmitted via network 116 to personnel computing device 300 such as store computing device 104 and/or offsite computing device 128.

Figure 5C:
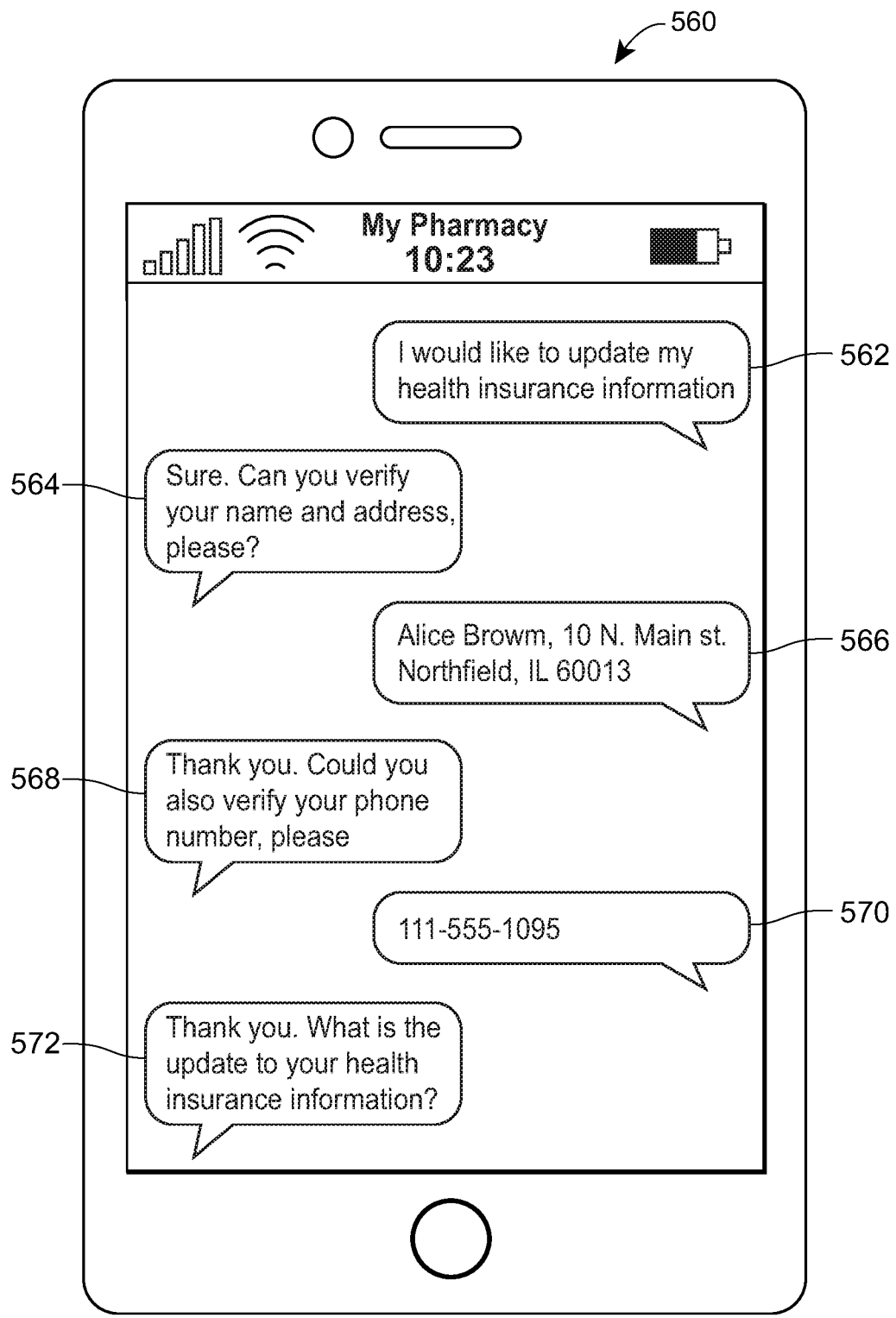
FIG. 5C illustrates an exemplary secondary user interface 560 for customer two-way communication initiation.

FIGS. 5A-C illustrate exemplary user interfaces associated with two-way communication utilization by a customer, including contact availability notification, contact option presentation and selection, and contact initiation. Each of the exemplary user interfaces may be presented to the customer via a display 210 of a customer computing device 200, such as a mobile computing devices 112.1-112.M.

FIG. 5A illustrates an exemplary primary user interface 500 for two-way communication availability notification to a customer. A notification 502, indicating that store personnel are available for contact, may be presented. As illustrated, the notification 502 may present only a small portion of customer specific information, such as the customer's name. In various embodiments, the notification may present additional customer specific information including reason for visit information or order pickup information. The user interface may be interactive, such that the customer can select the notification 502 to view information about contact options and initiate contact.

In various embodiments, the notification 205 may be generated at the back-end components 118, at store computing device 104, and/or at offsite computing device 128 and received via communication network 116, via communication links 109.1-109.M, and/or via communication links 113.1-113.M at communication unit 212 of the customer computing device 200, such as a mobile computing devices 112.1-112.M.

FIG. 5B illustrates an exemplary secondary user interface 530 for customer two-way communication option presentation and selection. User interface 530 may be accessed upon selection of notification 502. The interface 530 may include options 532-534 to select a contact method for contact with store personnel. Additional customer profile options 536-544 for allowing the customer to access profile information may also be presented. The user interface may be interactive such that the customer can select contact method options 532-534 to initiate contact with store personnel.

In various embodiments, the interface 530 may be generated at the customer application module 207 of the customer computing device 200, such as a mobile computing devices 112.1-112.M. In various embodiments, the customer profile information may be stored at the memory 206 of the customer computing device 200, such as a mobile computing devices 112.1-112.M. In various embodiments, the customer profile information may be stored at the back-end components 118 and received via communication network 116 and communication unit 212 of the customer computing device 200, such as a mobile computing devices 112.1-112.M.

FIG. 5C illustrates an exemplary secondary user interface 560 for customer two-way communication initiation. User interface 560 may be accessed upon selection of contact method option 534. Chat message 562 may initiate communication between the customer and store personnel. The customer and store personnel may exchange messages 562-572. In various embodiments, the customer may type a message using a keyboard at the display 210 of the customer computing device 200, such as a mobile computing devices 112.1-112.M. In various embodiments, the customer may type a message using a keyboard otherwise associated with the customer computing device 200, such as a mobile computing devices 112.1-112.M.

In various embodiments, customer messages 562, 566, and 570 may be sent from the communication 212 of the customer computing device 200, such as a mobile computing devices 112.1-112.M and received at the communication 312 of the personnel computing device 300, such as store computing device 104 or offsite computing device 128. In various embodiments, personnel messages may be sent from the at the communication 312 of the personnel computing device 300, such as store computing device 104 or offsite computing device 128 and received at the communication 212 of the customer computing device 200, such as a mobile computing devices 112.1-112.M.

Figure 6:
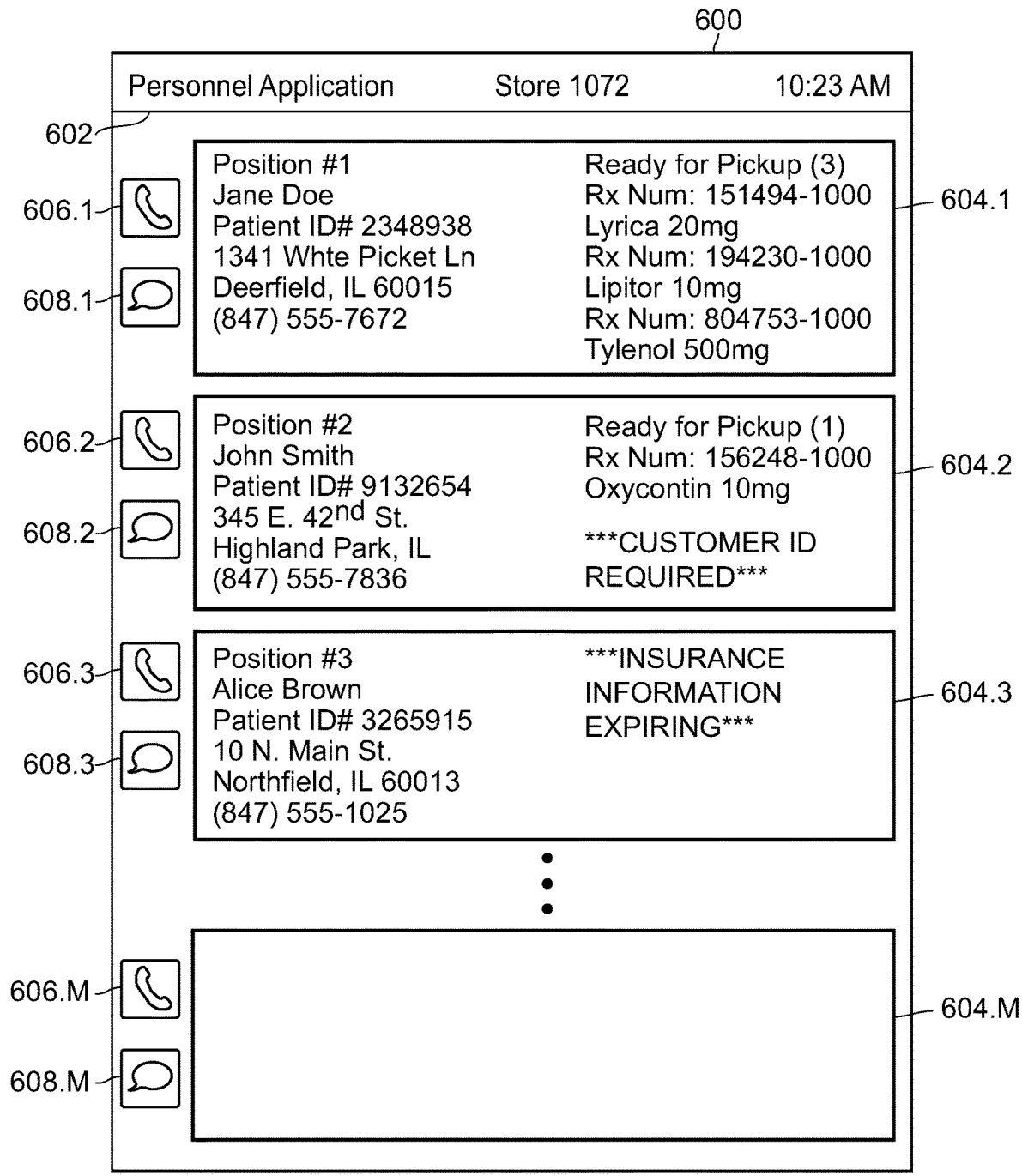
FIG. 6 illustrates an exemplary store personnel computing device interface for customer information display and two-way communication initiation.

FIG. 6 illustrates exemplary user interfaces associated with customer identification and presentation to store personnel. User interface 600 may be presented at the display 310 of personnel computing device 300, such as store computing device 104 or offsite computing device 128.

Portion 602 may include any suitable graphic, information, label, etc., to provide general information such as the name of the application, the name of the retailer, a store name, a store number, a current time of day, etc. As will be appreciated by those of ordinary skill in the relevant art(s), portion 602 may include any suitable type of information based upon a particular implementation of the application executed by personnel computing device 300. For example, although not shown in FIG. 6 for purposes of brevity, portion 602 may include information such as current dwell times for one or more customers, average dwell times for a particular period of time, average service times for a particular period of time, etc.

Portions 604.1-604.M may include any suitable graphic, information, label, etc., to provide customer information, each customer's pickup order information, reason for customer visit, and/or the position of each customer in the store access area such as a drive-thru lane. As will be appreciated by those of ordinary skill in the relevant art(s), portions 604.1-604.M may include different types of information based upon a particular implementation of the application executed by personnel computing device 300. For example, if personnel computing device 300 is implemented in a restaurant drive-thru, the information displayed in each of the portions 604.1-604.M may be food and/or drink order information.

As shown in FIG. 6, each of portions 604.1-604.M may include customer information such as the customer's name, identification number, address, phone number, etc. This information may be retrieved from personnel computing device 300 in a number of ways, such as by receiving this information from each of the customer's respective mobile computing device (e.g., mobile computing devices 112.1-112.M), from one or more back-end components (e.g., back-end components 118), retrieving data that has been entered by store staff and stored locally on drive-thru computing device 300 such as store computing device 104 or offsite computing device 128, etc. In various embodiments, customer information may not be included, for example, if customer information is not known, for example, if the customer application module 207 is not downloaded on customer computing device 200, such as a mobile computing devices 112.1-112.M.

Furthermore, each of portions 604.1-604.M may include a graphical representation and/or a text description of each customer's position in an access area. For example, as shown in FIG. 6, each of portions 604.1-604.3 is displayed at user interface 600 in the same position as each respective customer in the exemplary drive-thru lane of FIG. 1, with the top portion 604.1 being the closest customer to the drive-thru window, followed by the customer in portion 604.2, etc. Furthermore, each of portions 604.1-604.3 includes a text description of each respective customer's position, i.e., "position 1," "position 2," etc.

In addition, each of portions 604.1-604.M may include an indication of each customer's respective prescription pickup order information, such as the number of prescriptions, the name of each prescription drug, the dosage of each prescription drug, the type of each prescription drug, etc. Based upon the types of prescription drug, the prescription information may include a notification to pharmacy staff, such as the indication that identification is needed from the customer for the customer John Smith, as shown in portion 604.2. As will be appreciated by those of ordinary skill in the relevant art(s), any suitable type of notification may be displayed in one or more of portions 604.1-604.M, such as instructions or other information for pharmacy staff to relay to the customer, whether the prescription drug should be taken with food, etc. Furthermore, because customer's are driving when picking up their prescriptions, a notification to prescription staff to inform customers not to take some prescription drugs until they are no longer driving, when applicable, may be of particular importance. In alternative embodiments, each of portions 604.1-604.M may include an indication of each customer's respective reason for visit information, such as updates to customer account information and/or health information as presented for customer Alice Brown in portion 604.3.

The interface 600 may include options 606.1-606.M and options 608.1-608.M to select a contact method for contact with customer. In various embodiments, the user interface may be interactive such that upon selection of one of options 606.1-606.M store personnel may be able to initiate an audio conversation with a respective customer. In various embodiments, the user interface may additionally be interactive such that upon selection of one of options 608.1-608.M store personnel may be able to initiate a chat conversation with a respective customer.

Figure 7:
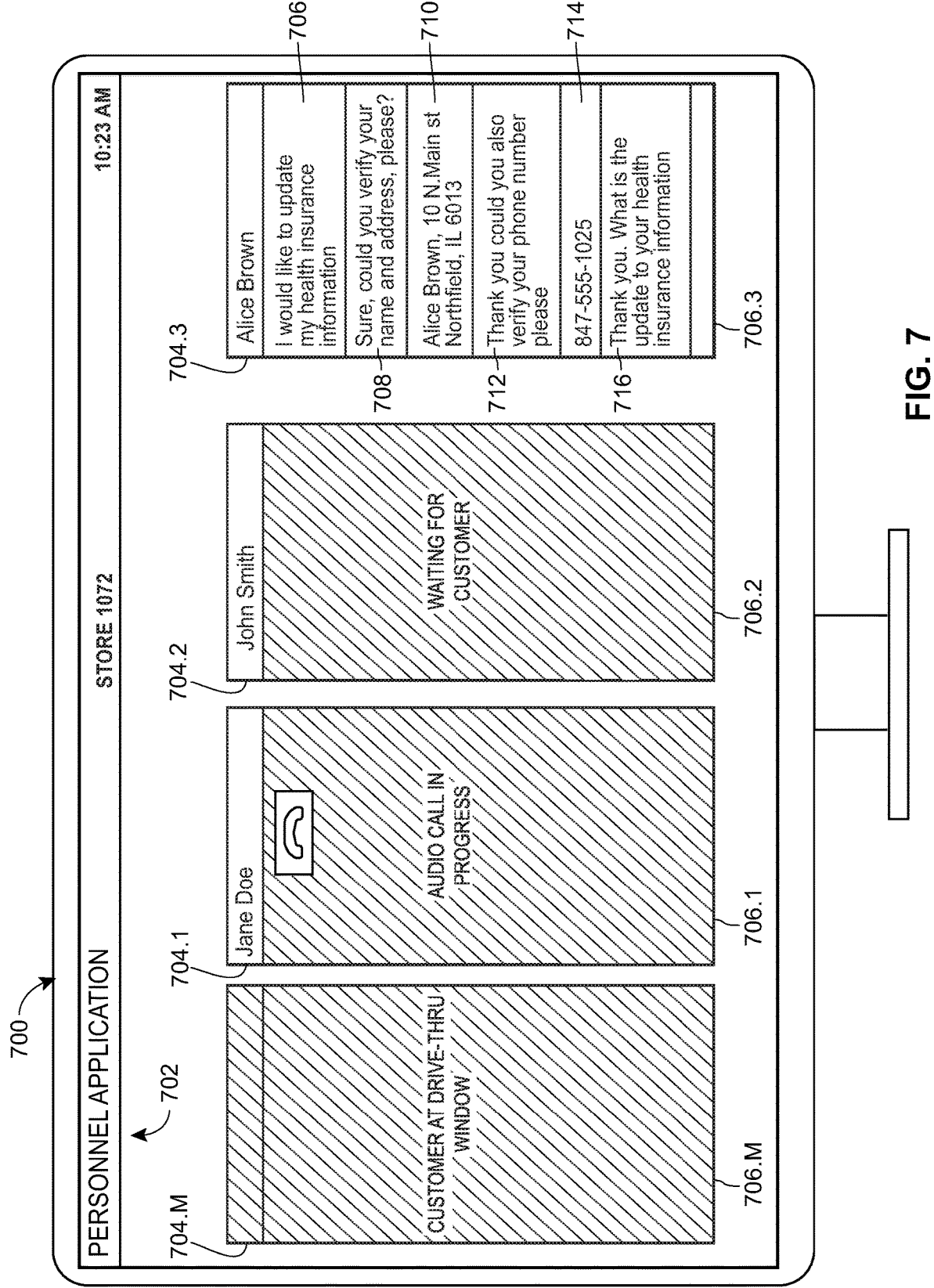
FIG. 7 illustrates an exemplary store personnel computing device interface for two-way communication with multiple customers.

FIG. 7 illustrates exemplary user interfaces associated with store personnel two-way communication initiation. User interface 700 may be presented at the display 310 of personnel computing device 300, such as store computing device 104 or offsite computing device 128.

Portion 702 may include any suitable graphic, information, label, etc., to provide general information such as the name of the application, the name of the retailer, a store name, a store number, a current time of day, etc. As will be appreciated by those of ordinary skill in the relevant art(s), portion 702 may include any suitable type of information based upon a particular implementation of the application executed by personnel computing device 300. For example, although not shown in FIG. 7 for purposes of brevity, portion 702 may include information such as current dwell times for one or more customers, average dwell times for a particular period of time, average service times for a particular period of time, etc.

Portions 704.1-704.M may include any suitable graphic, information, label, etc., to provide customer information. In various embodiments, portions 704.1-704.M may also provide each customer's pickup order information, customer's reason for visit information, and/or the position of each customer in the store access area such as a drive-thru lane. As will be appreciated by those of ordinary skill in the relevant art(s), portions 704.1-704.M may include different types of information based upon a particular implementation of the application executed by personnel computing device 300. For example, if personnel computing device 300 is implemented in a restaurant drive-thru, the information displayed in each of the portions 704.1-704.M may be food and/or drink order information.

Each of portions 704.1-704.M may include customer information such as the customer's name, identification number, address, phone number, etc. This information may be retrieved from personnel computing device 300 in a number of ways, such as by receiving this information from each of the customer's respective mobile computing device (e.g., mobile computing devices 112.1-112.M), from one or more back-end components (e.g., back-end components 118), retrieving data that has been entered by store staff and stored locally on drive-thru computing device 300 such as store computing device 104 or offsite computing device 128, etc. Each of portions 704.1-704.M may also not include customer information, for example, if a customer is currently being helped at a window of the access area of a brick-and-mortar store such as a drive-thru window as shown in FIG. 7 at portion 704.M. In alternate embodiments, 704.1-704.M may also not include customer information, for example, if a customer's information is not known, for example, if the customer application module 207 is not present of the customer computing device 200 such as a mobile computing device 112.1-112.M.

Furthermore, each of portions 704.1-704.M may include a graphical representation and/or a text description of each customer's position in an access area. In addition, each of portions 704.1-704.M may include an indication of each customer's respective prescription pickup order information, such as the number of prescriptions, the name of each prescription drug, the dosage of each prescription drug, the type of each prescription drug, etc. In alternative embodiments, each of portions 704.1-704.M may include an indication of each customer's respective reason for visit, such as updates to customer account information and/or health information.

Portions 706.1-706.M may include any suitable any suitable graphic, information, label, etc., to provide a record of two-way communication with a customer. Portions 706.1-706.M may indicate a method of two way-communication such as chat or audio contact. Portions 706.1-706.M may additionally indication a status of communication such as for example two-way communication has ended if, for example, a customer approaches an access area window such as a drive through window such as in FIG. 7 at 706.M. In various embodiments a status of communication may be an indication that a customer has been contacts such as in FIG. 7 at 706.2. In various embodiments, a status of communication may be an indication that an audio call is in progress such as in FIG. 7 at 706.1. In various embodiments a status of communication may be an indication that chat communication is in progress or an status of a chat conversation such as in FIG. 7 at 706.1.

The user interface may be interactive such that store personnel can select call option 718 to modify for example end a call of status 706.1 with the customer as presented at 704.1. The interface may also be interactive such that store personnel can send chat messages 708, 712, and 716 and receive messages 706, 710, and 714 in a chat of status 706.3 with the customer as presented at 704.3.

In various embodiments call as presented at 706.1 may be between the communication 212 of the customer computing device 200, such as a mobile computing devices 112.1-112.M and received at the communication 312 of the personnel computing device 300, such as store computing device 104 or offsite computing device 128.

In various embodiments, customer messages 706, 710, and 714 may be sent from the communication 212 of the customer computing device 200, such as a mobile computing devices 112.1-112.M and received at the communication 312 of the personnel computing device 300, such as store computing device 104 or offsite computing device 128. In various embodiments, personnel messages 708, 712. And 716 may be sent from the at the communication 312 of the personnel computing device 300, such as store computing device 104 or offsite computing device 128 and received at the communication 212 of the customer computing device 200, such as a mobile computing devices 112.1-112.M.

Figure 8:
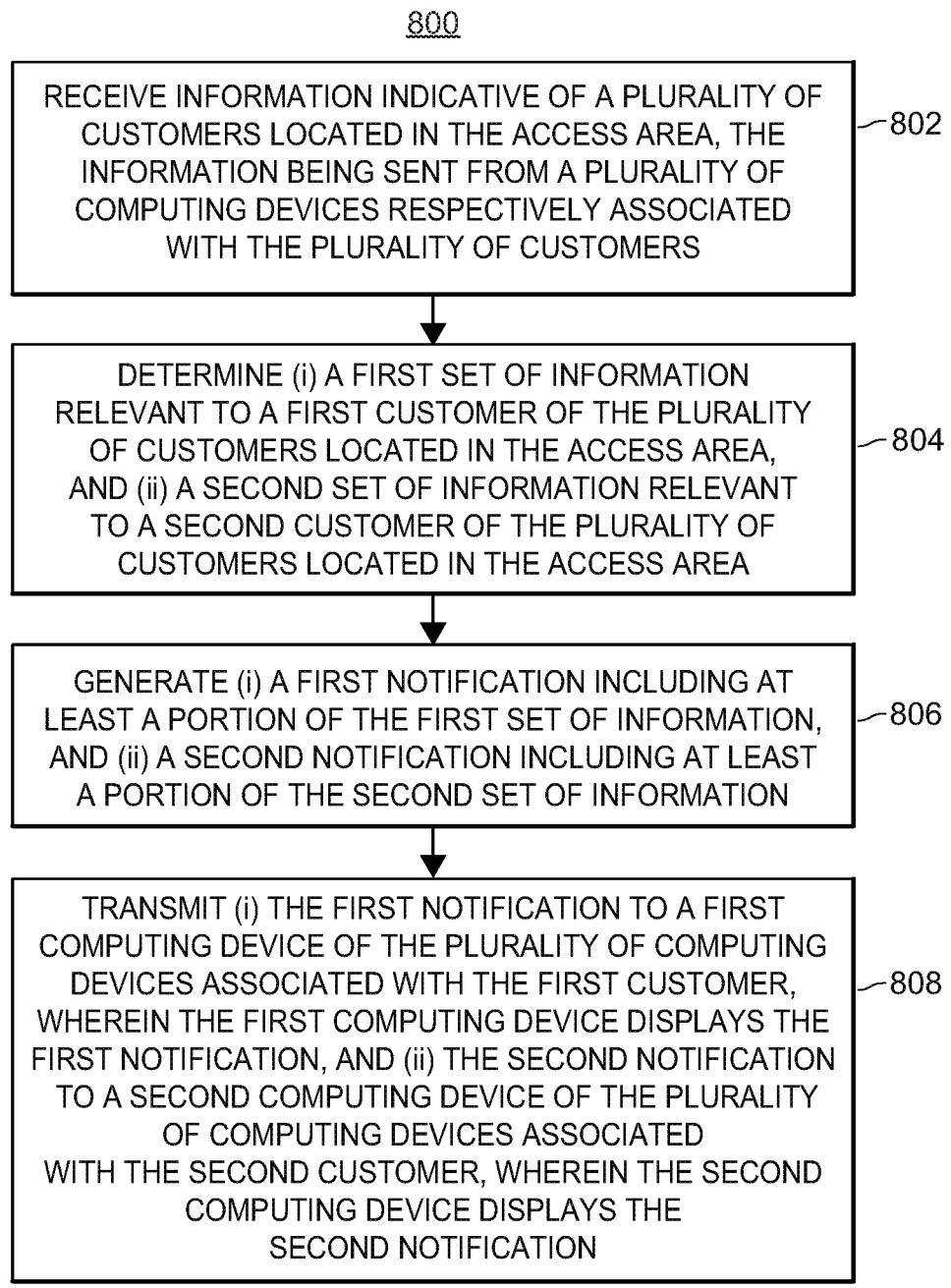
FIG. 8 illustrates a flow diagram of an exemplary two-way communication system between personnel of a brick-and-mortar store and customers in an access area of the brick-and-mortar store.

FIG. 8 illustrates a method flow 800, according to an embodiment. In an embodiment, one or more portions of method 800 (or the entire method 800) may be implemented by any suitable device, and one or more portions of method 800 may be performed by more than one suitable device in combination with one another. For example, one or more portions of method 800 may be performed by personnel computing device 300, as shown in FIG. 3 such as store computing device 104 and/or offsite computing device 128, as shown in in FIG. 1. To provide another example one or more portions of method 800 may be performed by one or more back-end components 118, as shown in FIG. 1. In an embodiment, method 800 may be performed by any suitable combination of one or more processors, applications, algorithms, and/or routines, such as CPU 302 and/or GPU 304 executing instructions stored in memory personnel application module 307 in conjunction with user input received via user interface 308, for example.

Method 800 may start when one or more processors receives information indicative of a plurality of customers located in an access area (block 803). The information may be sent from a plurality of computing devices respectfully associated with the plurality of customers, such as one or more mobile computing device 112.1-112.M, for example. As shown in FIG. 1. The information indicative of a plurality of customers may include for example, phone information such as a phone number that may be associated with a customer. The information indicative of a plurality of customers may include, for example, customer information such as a customer's name, a customer's account number, a customer's account login ID, a customer's patient ID. This information may be stored at customer application module 207 in the memory 206 of the customer computing device 200 of FIG. 2 such as mobile computing devices 112.1-112.M, for example, as shown in FIG. 1.

The one or more processors receiving the customer information may include, for example, one or more portions of personnel computing device 300, such as CPU 302 working in conjunction with communication unit 312, for example, to receive the customer information directly from one or more mobile computing devices or via a suitable communication network, such as communication network 116, for example, as shown in FIG. 1 (block 802).

To provide another example, one or more processors receiving the customer information may include any suitable portion of one or more back-end components, such as one or more back-end components 118, for example, receiving the customer information from one or more mobile computing devices via a suitable communication network, such as communication network 116, for example, as shown in FIG. 1, (block 802).

Information indicative of a plurality of customers may further include ranging data corresponding to a signal transmitted by a transmitter that is positioned at a predetermined location within the drive-thru lane. This ranging data may include, for example, data indicative of a received signal strength corresponding to a signal received by a plurality of respective mobile computing devices within the drive-thru lane. Again, the ranging data may include data corresponding to an indication of a range between one more mobile computing devices and any suitable number of transmitters. The ranging data may be sent from one or more respective mobile computing devices associated with each of the plurality of customers, such as one or more mobile computing devices 112.1-112.M, for example, as shown in FIG. 1. The ranging data may include, for example, any information suitable for identifying the position of each customer within the drive-thru lane, such as signal strength data (e.g., RSSI values), range information (e.g., near, intermediate, far, etc.) and/or positions calculated from one or more of the signal strength data and/or range information.

The one or more processors receiving the ranging data may include, for example, one or more portions of personnel computing device 300, such as CPU 302 working in conjunction with communication unit 312, for example, to receive the ranging data directly or indirectly from one or more mobile computing devices via, for example, links 109.1-109.M and communication network 116, respectively, for example, as shown in FIG. 1. To provide another example, one or more processors receiving the ranging data may include any suitable portion of one or more back-end components, such as one or more back-end components 118, for example, receiving the ranging data from one or more mobile computing devices via a suitable communication network, such as communication network 116, for example, as shown in FIG. 1.

Method 800 may include one or more processors determining a first set of information relevant to a first customer of the plurality of customers located in the access area and a second set of information relevant to a second customer of the plurality of customers located in the access area (804). The first set of information or the second set of information may include customer pickup order information such a prescription order information such as prescription drug type and/or dosage. The first set of information or the second set of information may include reason for visit information including changes to a customer's account such as changes in health insurance information or changes in payment information. The first set of information or the second set of information may include store information regarding the store associated with the access area in which the customer is located. Store information may include store contact information.

The one or more processors may be able to determine a position of each of the plurality of customer the customer within the drive-thru lane based upon the ranging data and the predetermined location of the transmitter. This determination may be made using any suitable calculation techniques, such as single transmitter signal strength values, multiple transmitter signal strength values, etc., as previously discussed with reference to FIGS. 4A-B. The determination of the position of each customer may be made by, for example, any combination of personnel computing device 300 and one or more back-end components 118. For example, this determination may be performed locally by personnel computing device 300 using the received ranging data. To provide another example, this determination may be performed by one or more of back-end components 118 using the received ranging data, which may in turn be sent to personnel computing device 300. The first set of information or the second set of information may include the position of the customer within the access area.

The one or more processors may generate first notification including at least a portion of the first set of information, and a second notification including at least a portion of the second set of information. The generation of the notification may be made by, for example, any combination of personnel computing device 300 and one or more back-end components 118. For example, this generation may be performed locally by personnel computing device 300 using the received ranging data. To provide another example, this generation may be performed by one or more of back-end components 118 using the received ranging data, which may in turn be sent to drive-thru computing device 300.

The one or more processors may transmit the first notification to a first computing device of the plurality of computing devices associated with the first customer, wherein the first computing device displays the first notification and the second notification to a second computing device of the plurality of computing devices associated with the second customer, wherein the second computing device displays the second notification.

The notification may further enable the computing device to initiate a live audio session and/or a live chat session with store personnel. Additionally, the notifications may be sent in an order based on the position of the vehicles in the access area. Additionally, if two or more mobile devices are determined to be located in the same vehicle, the notification may only be sent to one of the two mobile devices.

In general, a computer program product in accordance with an embodiment may include a computer usable storage medium (e.g., standard random access memory (RAM), an optical disc, a universal serial bus (USB) drive, or the like) having computer-readable program code embodied therein, wherein the computer-readable program code may be adapted to be executed by processor(s) (e.g., working in connection with operating system(s)) to facilitate the functions as described herein. In this regard, the program code may be implemented in any desired language, and may be implemented as machine code, assembly code, byte code, interpretable source code or the like (e.g., via Golang, Python, Scala, C, C++, Java, Actionscript, Objective-C, Javascript, CSS, XML). In some embodiments, the computer program product may be part of a cloud network of resources.

Although the following text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

What is claimed:

1. A method for enabling two-way communication between personnel of a brick-and-mortar store and each of a plurality of customers within an access area of the brick-and-mortar store, the method comprising:

receiving, via a communication network, at a server associated with the store, information indicative of a plurality of customers located in the access area, the information being sent from a plurality of computing devices respectively associated with the plurality of customers;

determining, from the information, (i) a first set of information relevant to a first customer of the plurality of customers located in the access area, and (ii) a second set of information relevant to a second customer of the plurality of customers located in the access area;

generating (i) a first notification including at least a portion of the first set of information, and (ii) a second notification and including at least a portion of the second set of information; and transmitting, via the communication network from the server, (i) the first notification to a first computing device of the plurality of computing devices associated with the first customer, wherein the first computing device displays the first notification and the first notification enables the first computing device to initiate one of a live chat session or a live audio session with the server thereby allowing the first customer to communicate with the personnel of the brick-and-mortar store, and (ii) the second notification to a second computing device of the plurality of computing devices associated with the second customer, wherein the second computing device displays the second notification and the second notification enables the second computing device to initiate one of a live chat session or a live audio session with the server thereby allowing the second customer to communicate with the personnel of the brick-and-mortar store.

2. The method of claim 1, wherein the server is located at the brick-and-mortar store or remote from the brick-and-mortar store, and wherein the personnel are located at the brick-and-mortar store or remote from the brick-and-mortar store.

3. The method of claim 1, wherein (i) the first set of information relevant to the first customer includes one or more of first reason for visit information or first order pickup information associated with the first customer, and (ii) the second set of information relevant to the second customer includes one or more of second reason for visit information or second order pickup information associated with the second customer.

4. The method of claim 1, further comprising:
receiving, via the communication network, (i) first ranging data indicative of first received signal strengths corresponding to a first plurality of signals received by the first computing device, the first plurality of signals being transmitted by a transmitter that is positioned at a predetermined location within the access area and (ii) second ranging data indicative of second received signal strengths corresponding to a second plurality of signals received by the second computing device, the second plurality of signals being transmitted by the transmitter that is positioned at the predetermined location within the access area; and
determining a position of (i) the first computing device within the access area based upon the first ranging data and the predetermined location of the transmitter, and (ii) the second computing device within the access area based upon the second ranging data and the predetermined location of the transmitter.

5. The method of claim 4, further comprising: transmitting the first notification and the second notification based on the respective positions of the computing devices within the access area.

6. The method of claim 4, further comprising: determining that the first customer and the second customer are located in a common vehicle based upon the first ranging data, the second ranging data, and the predetermined location of the transmitter.

7. The method of claim 6, further comprising: transmitting via the communication network from the server, one of the first notification to the first computing device or the second notification to the second computing device.

8. A system for enabling two-way communication between personnel of a brick-and-mortar store and each of a plurality of customers within an access area of the brick-and-mortar store, the system comprising:
one or more processors; and
a program memory coupled to the one or more processors storing executable instructions that, when executed by the one or more processors, cause the system to:
receive at a server associated with the store, information indicative of a plurality of customers located in the access area, the information being sent from a plurality of computing devices respectively associated with the plurality of customers,
determine (i) a first set of information relevant to a first customer of the plurality of customers located in the access area, and (ii) a second set of information relevant to a second customer of the plurality of customers located in the access area,
generate (i) a first notification including at least a portion of the first set of information, and (ii) a second notification and including at least a portion of the second set of information, and
transmit (i) the first notification to a first computing device of the plurality of computing devices associated with the first customer, wherein the first computing device displays the first notification and the first notification enables the first computing device to initiate one of a live chat session or a live audio session with the server thereby allowing the first customer to communicate with the personnel of the brick-and-mortar store, and (ii) the second notification to a second computing device of the plurality of computing devices associated with the second customer, wherein the second computing device displays the second notification and the second notification enables the second computing device to initiate one of a live chat session or a live audio session with the server thereby allowing the second customer to communicate with the personnel of the brick-and-mortar store.

9. The system of claim 8, wherein the server is located at the brick-and-mortar store or remote from the brick-and-mortar store, and wherein the personnel are located at the brick-and-mortar store or remote from the brick-and-mortar store.

10. The system of claim 8, wherein (i) the first set of information relevant to the first customer includes one or more of first reason for visit information or first order pickup information associated with the first customer, and (ii) the second set of information relevant to the second customer includes one or more of second reason for visit information or second order pickup information associated with the second customer.

11. The system of claim 8, wherein the program memory further stores executable instructions that cause the system to:
receive (i) first ranging data indicative of first received signal strengths corresponding to a first plurality of signals received by the first computing device, the first plurality of signals being transmitted by a transmitter that is positioned at a predetermined location within the access area and (ii) second ranging data indicative of second received signal strengths corresponding to a second plurality of signals received by the second computing device, the second plurality of signals being transmitted by the transmitter that is positioned at the predetermined location within the access area, and
determine a position of (i) the first computing device within the access area based upon the first ranging data and the predetermined location of the transmitter, and (ii) the second computing device within the access area based upon the second ranging data and the predetermined location of the transmitter.

12. The system of claim 11, wherein the program memory further stores executable instructions that cause the system to: transmit the first notification and the second notification based on the respective positions of the of computing devices within the access area.

13. The system of claim 11, wherein the program memory further stores executable instructions that cause the system to: determine that the first customer and the second customer are located in a common vehicle based upon the first ranging data, the second ranging data, and the predetermined location of the transmitter.

14. The system of claim 13, wherein the program memory further stores executable instructions that cause the system to: transmit one of the first notification to the first computing device or the second notification to the second computing device.

15. A tangible, non-transitory, computer-readable medium storing instructions for enabling two-way communication between personnel of a brick-and-mortar store and each of a plurality of customers within an access area of the brick-and-mortar store that, when executed by at least one processor of a computer system, cause the computer system to:
  receive at a server associated with the store, information indicative of a plurality of customers located in the access area, the information being sent from a plurality of computing devices respectively associated with the plurality of customers;
  determine (i) a first set of information relevant to a first customer of the plurality of customers located in the access area, and (ii) a second set of information relevant to a second customer of the plurality of customers located in the access area;
  generate (i) a first notification including at least a portion of the first set of information, and (ii) a second notification and including at least a portion of the second set of information; and
  transmit (i) the first notification to a first computing device of the plurality of computing devices associated with the first customer, wherein the first computing device displays the first notification and the first notification enables the first computing device to initiate one of a live chat session or a live audio session with the server thereby allowing the first customer to communicate with the personnel of the brick-and-mortar store, and (ii) the second notification to a second computing device of the plurality of computing devices associated with the second customer, wherein the second computing device displays the second notification and the second notification enables the second computing device to initiate one of a live chat session or a live audio session with the server thereby allowing the second customer to communicate with the personnel of the brick-and-mortar store.

16. The tangible, non-transitory, computer-readable medium of claim 15, further storing instruction that cause the computer system to:
  receive (i) first ranging data indicative of first received signal strengths corresponding to a first plurality of signals received by the first computing device, the first plurality of signals being transmitted by a transmitter that is positioned at a predetermined location within the access area and (ii) second ranging data indicative of second received signal strengths corresponding to a second plurality of signals received by the second computing device, the second plurality of signals being transmitted by the transmitter that is positioned at the predetermined location within the access area; and
  determine a position of (i) the first computing device within the access area based upon the first ranging data and the predetermined location of the transmitter, and (ii) the second computing device within the access area based upon the second ranging data and the predetermined location of the transmitter.

17. The tangible, non-transitory, computer-readable medium of claim 16, wherein the program memory further stores executable instructions that cause the system to: transmit the first notification and the second notification based on the respective positions of the of computing devices within the access area.

* * * * *